United States Patent
Sha et al.

(10) Patent No.: US 11,673,466 B2
(45) Date of Patent: Jun. 13, 2023

(54) FLIP COVER ASSEMBLY AND A FLIP COVER ACTUATING STRUCTURE FOR THE FLIP COVER ASSEMBLY

(71) Applicant: Illinois Tool Works Inc., Glenview, IL (US)

(72) Inventors: Wenquan Sha, Shanghai (CN); Yuan Sun, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 704 days.

(21) Appl. No.: 16/660,123

(22) Filed: Oct. 22, 2019

(65) Prior Publication Data

US 2020/0122570 A1   Apr. 23, 2020

(30) Foreign Application Priority Data

Oct. 23, 2018   (CN) .................... 2018112356665.5

(51) Int. Cl.

| | |
|---|---|
| *B60K 15/05* | (2006.01) |
| *E05B 81/36* | (2014.01) |
| *E05B 83/34* | (2014.01) |
| *E05F 15/614* | (2015.01) |
| *E05B 81/16* | (2014.01) |

(52) U.S. Cl.
CPC .............. *B60K 15/05* (2013.01); *E05B 81/16* (2013.01); *E05B 81/36* (2013.01); *E05B 83/34* (2013.01); *E05F 15/614* (2015.01); *B60K 2015/0515* (2013.01); *B60K 2015/0584* (2013.01)

(58) Field of Classification Search
CPC ............ B60K 15/05; B60K 2015/0507; B60K 2015/0515; B60K 2015/053; B60K 2015/0538; B60K 2015/0561; B60K 2015/0576; B60K 2015/0584; E05B 81/34; E05B 81/36; E05B 81/42
USPC ....................................................... 296/97.22
See application file for complete search history.

(56) References Cited

U.S. PATENT DOCUMENTS

| | | | | |
|---|---|---|---|---|
| 3,385,655 | A | * | 5/1968 | Huston ..................... A61L 2/26 292/144 |
| 4,530,185 | A | * | 7/1985 | Moriya ................. E05F 15/603 49/300 |
| 5,533,766 | A | * | 7/1996 | Farber .................... B60K 15/05 292/201 |

(Continued)

FOREIGN PATENT DOCUMENTS

| | | | |
|---|---|---|---|
| CN | 03137385 A | * | 6/1991 |
| CN | 110406370 A | * | 11/2019 |

(Continued)

OTHER PUBLICATIONS

Computer Generated Translation for DE 202010008751 U1, Generated on Jun. 13, 2022, https://worldwide.espacenet.com/ (Year: 2022).*

*Primary Examiner* — Alyson M Merlino

(74) *Attorney, Agent, or Firm* — Quarles & Brady LLP

(57) ABSTRACT

A flip cover actuation structure for actuating a flip cover includes a locking device, a rocker, and a driving device. The locking device locks and releases the flip cover. The rocker drives the flip cover to open and close. The driving device comprises a gear and an eccentric device. The driving device is configured to rotate the gear and the eccentric device. The gear drives the rocker. The eccentric device drives the locking device.

19 Claims, 18 Drawing Sheets

(56) References Cited

U.S. PATENT DOCUMENTS

| | | | | |
|---|---|---|---|---|
| 6,702,357 B2* | 3/2004 | Joerg | ................... | B60K 15/05 |
| | | | | 296/97.22 |
| 7,914,063 B2* | 3/2011 | Lederer | ................. | E05B 83/34 |
| | | | | 292/207 |
| 8,677,690 B2* | 3/2014 | Lee | ...................... | E05B 83/34 |
| | | | | 49/324 |
| 8,870,241 B2* | 10/2014 | Lee | ...................... | E05B 83/34 |
| | | | | 292/144 |
| 2008/0135552 A1* | 6/2008 | Baudoux | ............... | B60K 15/05 |
| | | | | 220/203.01 |
| 2009/0260716 A1* | 10/2009 | Baudoux | ............... | B60K 15/05 |
| | | | | 141/350 |
| 2022/0136291 A1* | 5/2022 | Sun | ........................ | E05B 83/34 |
| | | | | 49/280 |
| 2022/0136292 A1* | 5/2022 | Sun | ...................... | E05F 15/614 |
| | | | | 49/280 |

FOREIGN PATENT DOCUMENTS

| | | | | | |
|---|---|---|---|---|---|
| CN | 113073917 | A | * | 7/2021 | |
| CN | 113236048 | A | * | 8/2021 | |
| CN | 113978282 | A | * | 1/2022 | |
| CN | 114435120 | A | * | 5/2022 | ............. B60K 15/05 |
| DE | 202010008751 | U1 | * | 3/2012 | ......... B60K 15/0406 |
| FR | 2765836 | A1 | * | 1/1999 | ............. B60K 15/05 |

* cited by examiner

US 11,673,466 B2

FLIP COVER ASSEMBLY AND A FLIP COVER ACTUATING STRUCTURE FOR THE FLIP COVER ASSEMBLY

RELATED APPLICATIONS

This application claims the benefit of Chinese Patent Application No. 201811235665.5, filed Oct. 23, 2018, which is hereby incorporated by reference in its entirety.

TECHNICAL FIELD

The present disclosure relates to a flip cover assembly, and in particular to a flip cover assembly for a refueling port or a charging port of a vehicle.

BACKGROUND

A refueling port cover or a charging port cover of a vehicle is configured to expose or cover a refueling port or a charging port of the vehicle. The refueling port cover or the charging port cover is rotatably mounted on the body of the vehicle. Before filling or charging, the refueling port cover or charging port cover is in a closed position. In some instance, the refueling port cover or charging port cover is locked in the closed position. When filling or charging is required, the cover is moved from the closed position to an open position.

Therefore, an improved actuation structure is required to economically and effectively actuate the opening, closing, and locking of the refueling port flip cover or charging port cover.

SUMMARY

In one aspect, the present disclosure provides a flip cover actuation structure, comprising a flip cover, a locking device for locking and releasing the flip cover, a rocker for driving the flip cover to open and close, and a driving device. The driving device comprises a gear and an eccentric device. The driving device is configured to be capable of moving rotatably, such that the gear and the eccentric device are capable of rotating as the driving device rotates. The gear is configured to drive the rocker. The eccentric device is configured to drive the locking device.

In the flip cover actuation structure according to the above, the driving device further comprises a driving shaft. The gear and the eccentric device are disposed on the driving shaft opposite each other and are capable of rotating as the driving shaft rotates.

In the flip cover actuation structure according to the above, a part of an outer circumference of the gear can mesh with the rocker, and the other part does not mesh with the rocker.

In the flip cover actuation structure according to the above, the gear is configured to not mesh with the rocker during a process that the eccentric device drives the locking device to release the flip cover.

In the flip cover actuation structure according to the above, a part of the outer circumference of the gear is provided with a toothed portion, and the other part is provided with a smooth portion, so that the toothed portion can mesh with the rocker, and the smooth portion does not mesh with the rocker.

In the flip cover actuation structure according to the above, the central angle of the toothed portion of the outer circumference of the gear is greater than the maximal angle to which the flip cover can be opened.

In the flip cover actuation structure according to the above, the locking device further comprises a locking rod. A distal end of the locking rod is provided with a locking portion for locking the flip cover. The eccentric device has a working portion, and the working portion is configured to be capable of pushing the locking rod to move from a locked position to a released position or pulling the locking rod to move from the released position to the locked position when the working portion contacts with the locking device.

In the flip cover actuation structure according to the above, the flip cover is provided with a locking receiving portion for receiving the locking portion.

In the flip cover actuation structure according to the above, a proximal end of the locking rod is provided with an eccentric device receiving portion, and the eccentric device receiving portion comprises a receiving groove. The working portion of the eccentric device is provided with a protrusion, and when the eccentric device rotates, the protrusion is capable of entering the receiving groove of the eccentric device receiving portion or disengaging from the receiving groove of the eccentric device receiving portion.

In the flip cover actuation structure according to the above, the locking device further comprises an elastic device. The elastic device may apply a biasing force to the locking rod and is configured to be capable of moving the locking rod from the released position to the locked position.

In the flip cover actuation structure according to the above, the rocker comprises a sector-shaped meshing portion. Teeth are provided on a sector-shaped outer circumference of the meshing portion to mesh with the gear.

In the flip cover actuation structure according to the above, the rocker further comprises a rocker shaft. The rocker shaft is disposed at the top of the sector shape of the meshing portion, and the rocker shaft is connected to the flip cover, for driving the flip cover to open or close through the rotation of the rocker shaft.

In the flip cover actuation structure according to the above, the driving device is driven by a power source to rotate.

In another aspect, a flip cover assembly for a refueling port or charging port, includes a flip cover and a flip cover actuation structure. The flip cover actuation structure includes a locking device to lock and release the flip cover, a rocker to drive the flip cover to open and close, and a driving device. The driving device includes a gear and an eccentric device. The driving device is configured to rotate the gear and the eccentric device. The gear drives the rocker. The eccentric device drives the locking device.

In the flip cover assembly according to the above, the flip cover assembly further comprises a base. The flip cover actuation structure is mounted on the base. A driving device is mounted at a proximal end of the base. A locking device comprises a locking rod. The locking rod is mounted on an outer side of a side wall of the base and extends from a proximal end to a distal end. A distal end of the locking rod is provided with a locking portion for locking the flip cover. A proximal end of the flip cover is rotatably mounted at the proximal end of the base, and a distal end of the flip cover is provided with a locking receiving portion for receiving the locking portion.

The conceptions, specific structures, and resulting technical effects of the present disclosure are further described below in conjunction with the drawings to fully understand the object, features and effects of the present disclosure.

BRIEF DESCRIPTION OF THE DRAWINGS

The present disclosure will be more easily understood when the following detailed description is read in conjunction with the accompanying drawings. Throughout the drawings, like reference numbers represent like parts, in the drawings.

DETAILED DESCRIPTION OF EMBODIMENTS

Various embodiments of the present disclosure are described below with reference to the accompanying drawings which constitute part of the description. It is to be understood that although the terms indicating directions, for example, "front", "behind," "rear", "up", "down", "left", "right", "inside", "outside", "top", "bottom", "forward", "reverse", "proximal end", and "distal end", are used in the present disclosure to describe various examples of structural portions and elements in the present disclosure, these terms used herein are merely used for ease of illustration. These terms are determined based on the exemplary orientations shown in the accompanying drawings. Since the embodiments disclosed in the present disclosure can be arranged in different directions, these terms indicating directions are only illustrative and should not be considered as limitations.

Figure 1A:
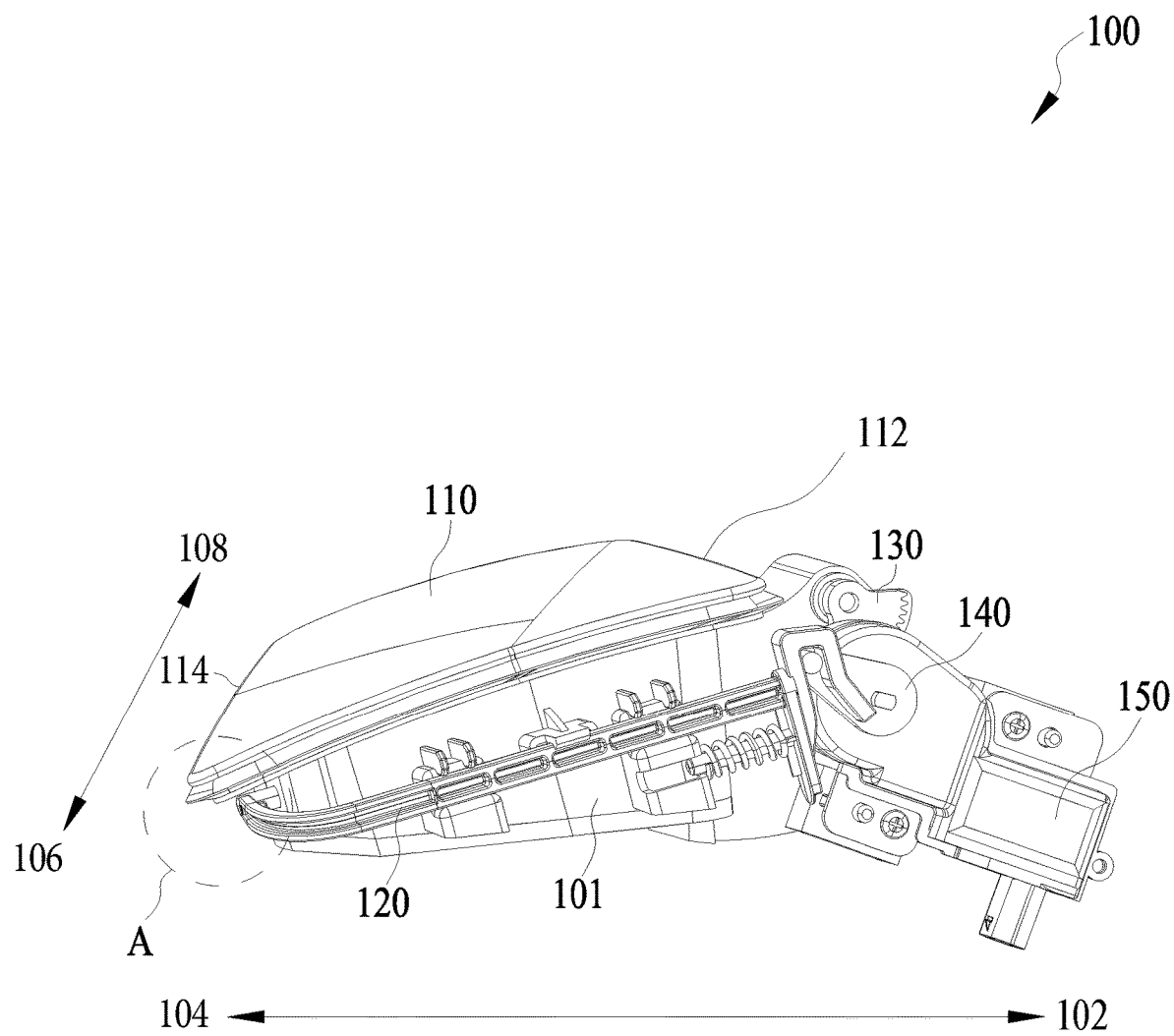
FIG. 1A is a front isometric view of a flip cover assembly according to an embodiment of the present disclosure in a closed state.
Figure 1B:
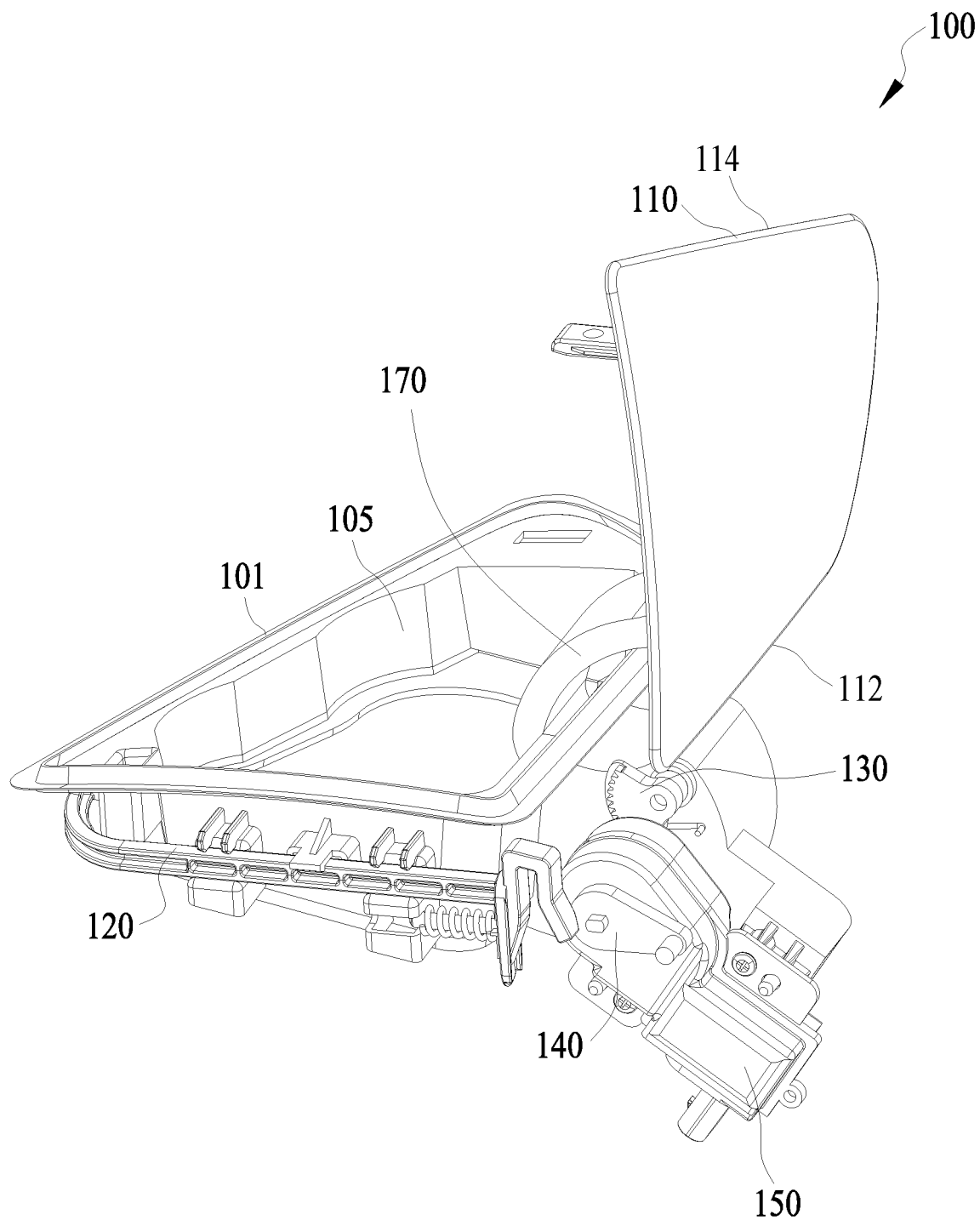
FIG. 1B is a isometric view of the flip cover assembly shown in FIG. 1A in an open state.
Figure 1C:
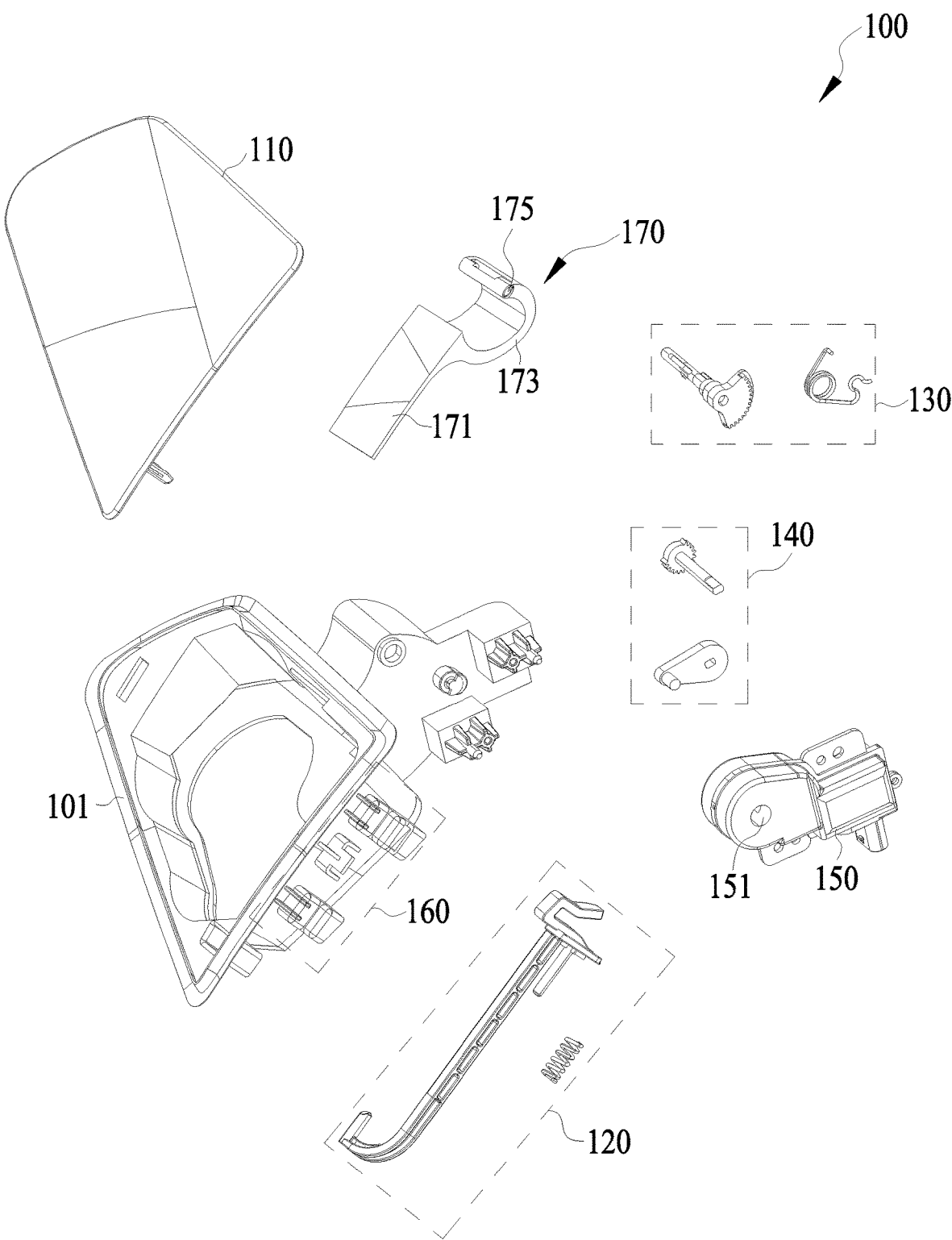
FIG. 1C is an exploded view of the flip cover assembly shown in FIG. 1A.

FIGS. 1A-1C are isometric views and an exploded view of a flip cover assembly 100 according to an embodiment of the present disclosure and are used to show the components of the flip cover assembly 100 and the position relationships among the components. FIG. 1A is a state view when a flip cover 110 is closed; FIG. 1B is a state view when the flip cover 110 is open; and FIG. 1C is an exploded view of the flip cover assembly 100. For ease of illustration and description, the right end of a base 101 shown in FIG. 1A is defined as a proximal end 102, and the other end opposite the proximal end 102 is defined as a distal end 104. That is, one end, connected to the base 101, of the flip cover 110 is the proximal end 102, and the other end opposite the proximal end 102 is the distal end 104. Moreover, the front side of the base 101 shown in FIG. 1A is defined as a front side 106, and the side opposite the front side is defined as a rear side 108.

As shown in FIGS. 1A-1C, the flip cover assembly 100 comprises: the base 101, the flip cover 110, and a flip cover actuation structure (or assembly) configured to actuate the flip cover. The flip cover actuation structure comprises: a locking device (or locking structure) 120, a rocker 130, a driving device 140, and a power source 150. The flip cover 110, the locking device 120, the rocker 130, the driving device 140, and the power source 150 are mounted on the base 101. Specifically, the flip cover 110 covers the top of the base 101, and the flip cover 110 is mounted on the base 101 by a hinge 170 at a proximal end 112 of the flip cover. A distal end 114 of the flip cover 110 may be locked on the base 101 and released from the base 101, and the flip cover 110 may rotate around the proximal end 112 of the flip cover to open and close, thereby to expose and cover an accommodating cavity 105 in the base 101. The locking device 120 is mounted on the front side 106 of the base 101 and is configured to lock and release the flip cover 110. The power source 150 is mounted at the lower portion of the front side 106 of the base 101 and is configured to provide a driving force to drive the flip cover 110 to open and close and drive the flip cover 110 to be locked and released. The rocker 130 is mounted at the upper portion of the front side 106 of the base 101 and is configured to drive the flip cover 110 to rotate to open and close the flip cover 110. The driving device 140 is mounted on the front side 106 of the base 101 and is configured to drive the locking device 120 and the rocker 130 by the driving force of the power source 150. The power source 150 is, for example, a motor.

The hinge 170 comprises a support portion 171 and a hinging portion 173. The support portion 171 of the hinge 170 is connected to the bottom of the flip cover 110. The hinging portion 173 of the hinge 170 is mounted in the base 101 and is connected to the rocker 130. A mounting hole 175 is provided in the hinging portion 173 of the hinge 170.

Figure 2:
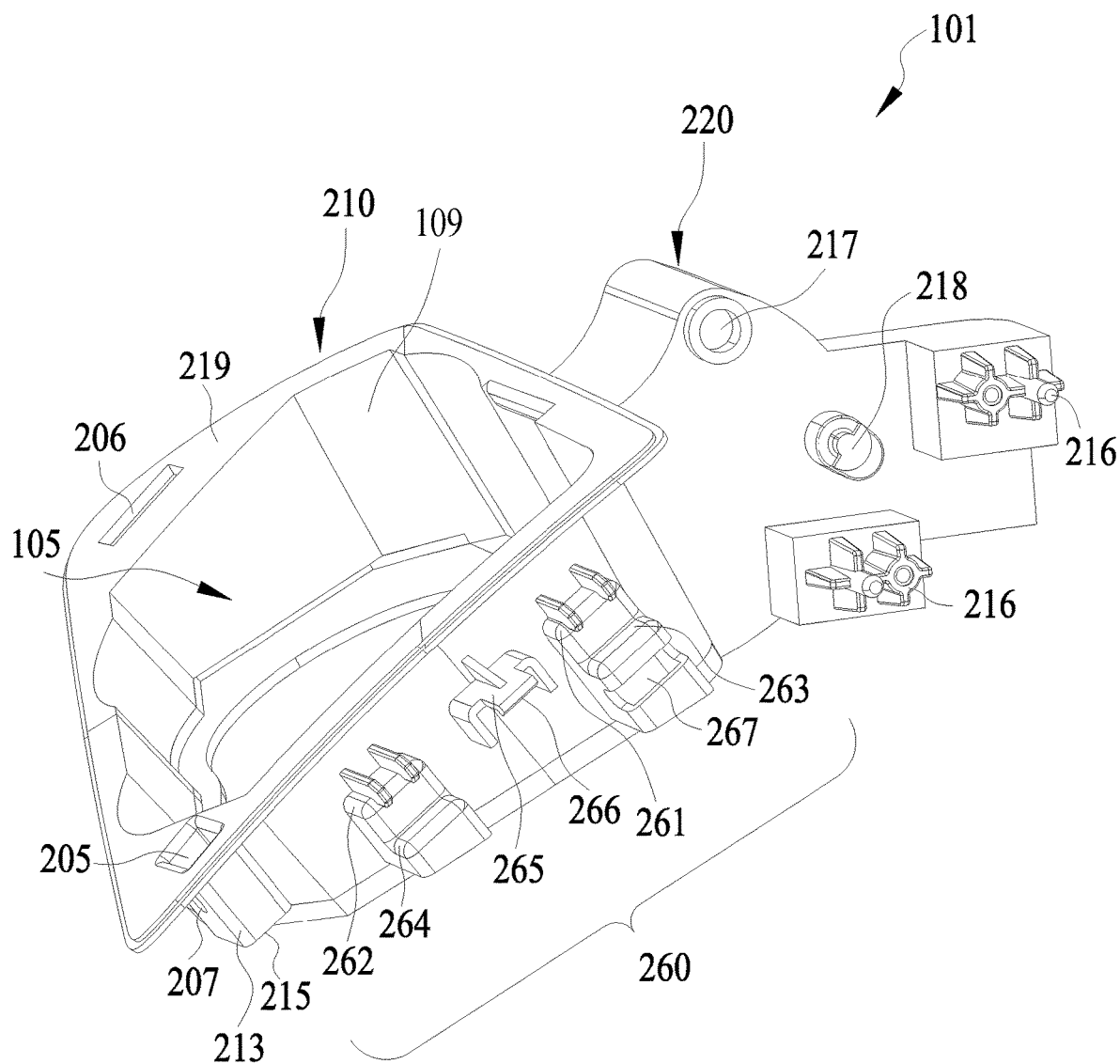
FIG. 2 is an enlarged view of a base shown in FIGS. 1A-1C.

FIG. 2 is an enlarged view of the base 101 shown in FIGS. 1A-1C and is used to show the specific structure of the base 101 more clearly. As shown in FIG. 2, the base 101 comprises a housing 210 that defines the accommodating cavity 105 and a mounting portion 220 connected to the housing 210. The mounting portion 220 is close to the proximal end 102 of the base 101. The base 101 can be mounted on the body of a vehicle by the mounting portion 220. The accommodating cavity 105 of the housing 210 has an opening at the top and an opening at the bottom. In this way, after the flip cover assembly 100 is mounted on the body of the vehicle, the accommodating cavity 105 is in communication with a fuel tank port or charging port of the vehicle. Moreover, an external component for filling or charging may enter the fuel tank port or charging port of the vehicle through the accommodating cavity 105. An accommodating cavity (not shown) in communication with the accommodating cavity 105 of the housing 210 is provided within the mounting portion 220 of the base 101 and is used to accommodate the hinging portion 173 of the hinge 170.

A support structure 260 is disposed in a position of the housing 210 on the front side 106 of the base 101. The support structure 260 is configured to be able to support the locking device 120 and guide the movement of the locking device 120. Specifically, the support structure 260 comprises two bosses 261, 262 that protrude outwardly from a side wall 109 of the base 101. Guide grooves 263, 264 that extend transversely are respectively provided on the bosses 261, 262. The guide grooves 263, 264 on the two bosses 261, 262 are aligned transversely. The support structure 260 further comprises a protruding tab 265 that protrudes outwardly from the side wall 109 of the base 101. The protruding tab 265 is located between the two bosses 261, 262. The protruding tab 265 is provided with a protruding edge 266 that extends longitudinally outward from the protruding tab 265. A guide groove 267 that substantially parallel to the guide groove 263 is further provided on the boss 261 close to the mounting portion 220 of the base 101.

A flange 219 that is folded outwards is disposed at the top of the housing 210 of the base 101. A locking opening 205 and a limit opening 206 are provided in the flange 219 of the housing 210. The locking opening 205 is disposed in a position close to the front side 106 and the distal end 104 of the base 101. The limit opening 206 is disposed in a position close to the rear side 108 and the distal end 104 of the base 101. The locking opening 205 is configured to receive a locking receiving portion 311 (referring to FIG. 3) on the flip cover 110 when the flip cover 110 is closed. The limit opening 206 is configured to cooperate with the flip cover 110 to limit the flip cover 110 when the flip cover 110 is closed. A locking cover 213 that extends downwards from an edge of the locking opening 205 is further disposed on the lower side of the flange 219. A locking channel 215 configured to receive the locking receiving portion 311 (referring to FIG. 3) on the flip cover 110 is defined in the locking cover 213 (also may refer to FIG. 4C). A through hole 207 in communication with the locking channel 215 is defined in the locking cover 213 opposite the housing 210.

A power source mounting portion 216, a rocker mounting hole 217, and a driving device mounting hole 218 are disposed in a position of the mounting portion 220 on the front side 106 of the base 101. The rocker mounting hole 217 is aligned with the mounting hole 175 in the hinging portion 173 of the hinge 170 accommodated in the mounting portion 220 of the base 101.

Figure 3:
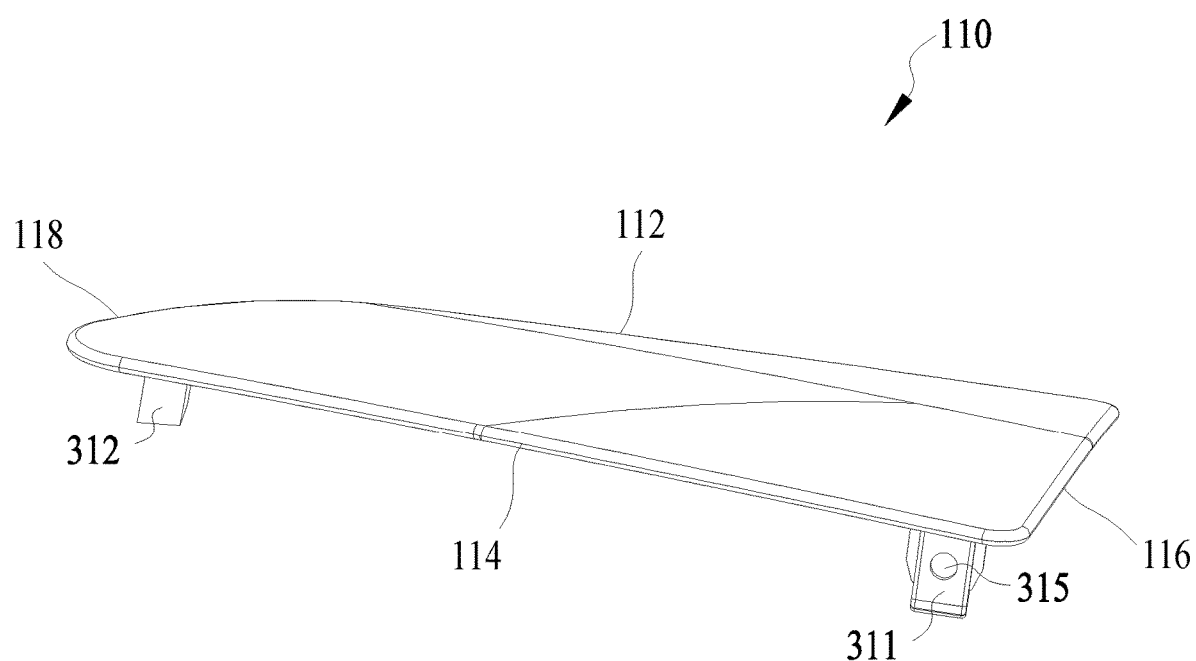
FIG. 3 is an enlarged view of a flip cover shown in FIGS. 1A-1C.

FIG. 3 is an enlarged view of the flip cover 110 shown in FIGS. 1A-1C and is used to show the specific structure of the flip cover 110 more clearly. The structure of the flip cover 110 shown in FIG. 3 is observed in the direction from the distal end 114 to the proximal end 112 as shown in FIG. 1A. As shown in FIG. 3, the locking receiving portion 311 and a limit protrusion 312 are disposed at the distal end 114 of the flip cover 110. A locking hole 315 is disposed on the locking receiving portion 311. The locking receiving portion 311 is disposed in a position close to a front side 116 of the flip cover 110. The limit protrusion 312 is disposed in a position close to a rear side 118 of the flip cover 110. The locking receiving portion 311 is configured to cooperate with the locking device 120 to lock the flip cover 110, and the locking receiving portion 311 can be received in the locking opening 205 and the locking channel 215 (shown in FIG. 2) of the base 101 when the flip cover 110 is closed. The limit protrusion 312 is configured be able to insert into the limit opening 206 (shown in FIG. 2) of the base 101 when the flip cover 110 is in a closed state.

Figure 4A:
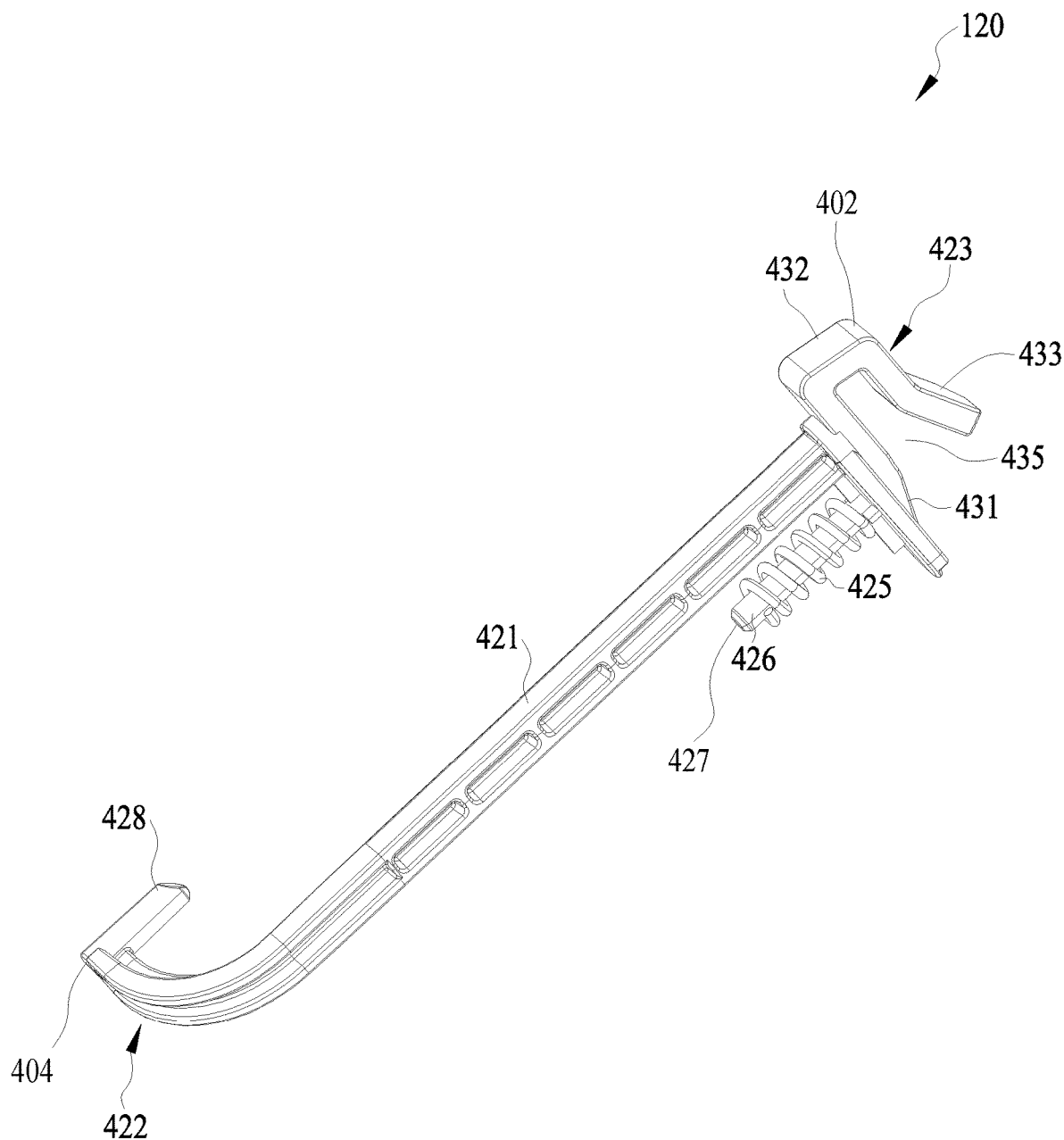
FIG. 4A is an enlarged view of a locking device shown in FIGS. 1A-1C.

FIG. 4A is an enlarged view of the locking device 120 shown in FIGS. 1A-1C and is used to show the specific structure of the locking device 120 more clearly. As shown in FIG. 4A, the locking device 120 comprises a locking rod 421. The locking rod 421 extends by a particular length to form an elongated shape. The locking device 120 further comprises a locking portion 422 disposed at a distal end 404 of the locking rod 421 and an eccentric device receiving portion 423 disposed at a proximal end 402 of the locking rod 421. The locking portion 422 are formed into a hook shape, with one end thereof being connected to the locking rod 421, and the other end thereof forming a locking pin 428. The eccentric device receiving portion 423 generally forms an inverted U-shape and comprises two side walls 431, 433 and a top wall 432 connected at the top of the two side walls 431, 433. A receiving groove 435 is formed between the two side walls 431, 433 of the eccentric device receiving portion 423. One side wall 431 of the eccentric device receiving portion 423 is connected to the locking rod 421.

The locking device 120 further comprises an elastic device 425 and a sleeve rod 426 configured to support the elastic device 425. One end of the sleeve rod 426 is connected to the locking rod 421 of the eccentric device receiving portion 423 via the side wall 431. The other end of the sleeve rod 426 is a free end 427. The sleeve rod 426 extends generally parallel to the locking rod 421. The elastic device 425 is, for example, a spring 425. The spring 425 is sleeved over the sleeve rod 426.

Figure 4B:
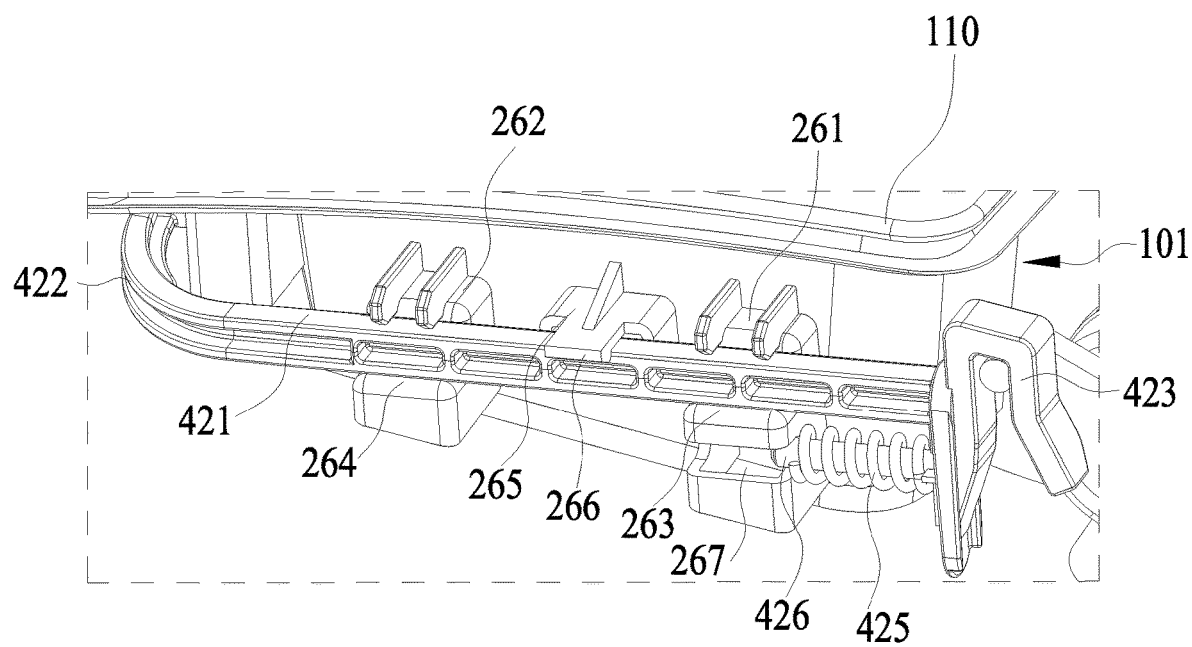
FIG. 4B is a partially enlarged view of the front side of the flip cover assembly in FIG. 1A.

FIG. 4B is a partially enlarged view of the front side of the flip cover assembly 100 in FIG. 1A and is used to show the assembly relationship between the locking device 120 and the base 101 more clearly. As shown in FIG. 4B, the locking rod 421 of the locking device 120 is mounted in the support structure 260 on the front side of the base 101. Specifically, the locking rod 421 is mounted in the guide grooves 263, 264 of the two bosses 261, 262 of the support structure 260 and is able to reciprocate in the guide grooves 263, 264. When the locking rod 421 is placed in the guide grooves 263, 264, the protruding edge 266 of the protruding tab 265 can abut against the locking rod 421 from the upper portion, so that the locking rod 421 can move more stably in the guide grooves 263, 264, and the elongated locking rod 421 is less likely to deform during the movement. The free end 427 of the sleeve rod 426 is inserted into the guide groove 267 of the boss 261. The size of the opening of the guide groove 267 is configured so that the sleeve rod 426 can be inserted into the guide groove, but the spring 425 cannot. In this way, one end of the spring 425 on the sleeve rod 426 abuts against the boss 261, and the other end abuts against the eccentric device receiving portion 423. The spring 425 can apply a biasing force towards the proximal end (that is, in the direction towards the eccentric device receiving portion 423) to the locking rod 421, so that the locking rod 421 can be moved from a released position to a locked position.

A locking portion 422 turns from the front side of the base 101 to the left side of the base 101, so that the locking pin 428 of the locking portion 422 can be inserted into the through hole 207 of the locking cover 213 on the base 101. Through the reciprocating movement of the locking rod 421 in the guide grooves 263, 264, the locking rod 421 can move between the released position and the locked position. When the locking rod 421 is in its locked position and the flip cover 110 is closed, the locking rod 421 can lock the flip cover 110 by the locking pin 428 thereof. When the locking rod 421 is in its released position, it can release the flip cover 110. The eccentric device receiving portion 423 can cooperate with the driving device 140, so that the locking rod 421 can reciprocate in the guide grooves 263, 264, which will be described below in detail with reference to FIG. 7.

Figure 4C:
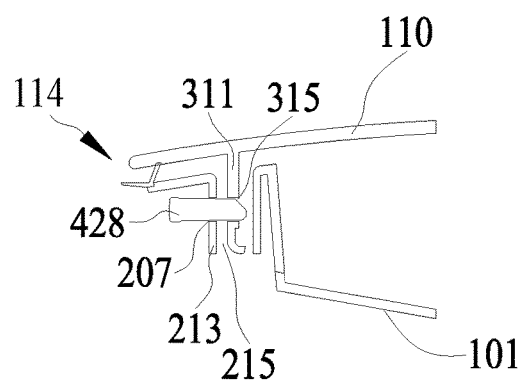
FIG. 4C is a partially enlarged sectional view of FIG. 1A.

FIG. 4C is a partially enlarged schematic sectional view of a region A in FIGS. 1A and 1s used to show the fitting relationship among the locking portion 422 of the locking device 120, the flip cover 110 and the base 101 more clearly. As shown in FIG. 4C, after the flip cover 110 is closed, when the locking rod 421 is in its locked position (shown in FIG. 4B), the locking pin 428 of the locking rod 421 can be inserted in the locking channel 215 and the locking hole 315 of the flip cover 110 located in the locking channel 215 through the through hole 207 of the locking cover 213 on the base 101, so that the flip cover 110 is locked on the base 101, to enable the flip cover 110 to be locked in a closed position. Before the flip cover 110 is opened, the locking rod 421 can move towards the distal end 114 to reach its released position, so that the locking pin 428 of the locking rod 421 exits the locking hole 315 of the flip cover 110 and the locking channel 215 of the base 101. In this way, the flip cover 110 can be released from the base 101 to enable the flip cover 110 to be opened.

Figure 5A:
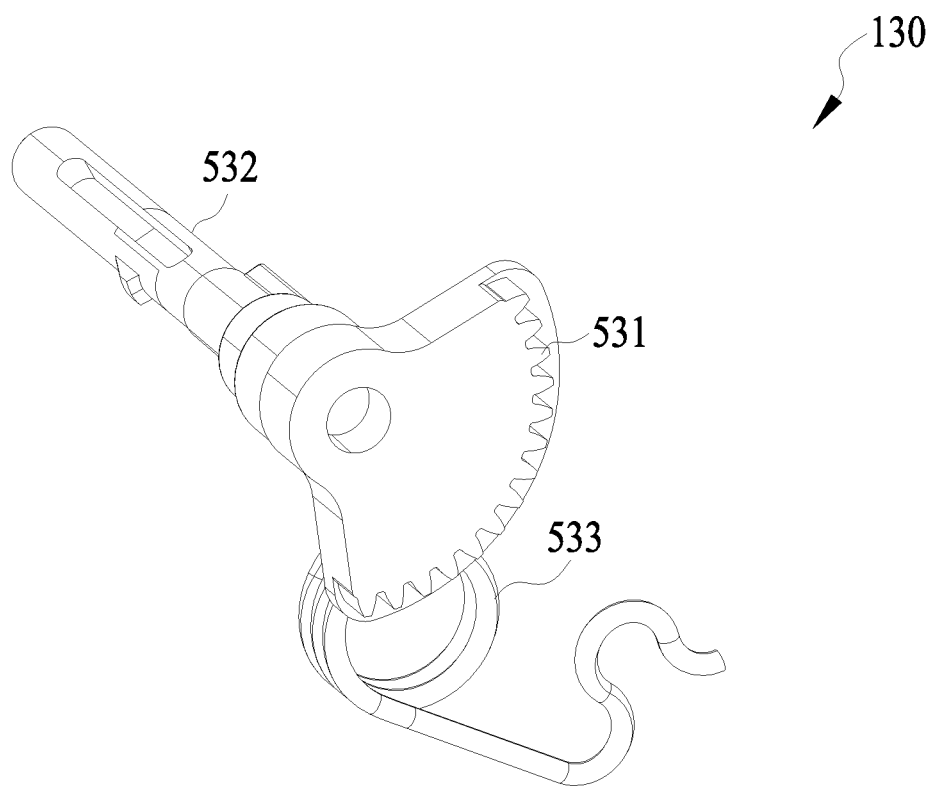
FIG. 5A is a schematic structural isometric view observed from the front of a rocker shown in FIGS. 1A-1C.
Figure 5B:
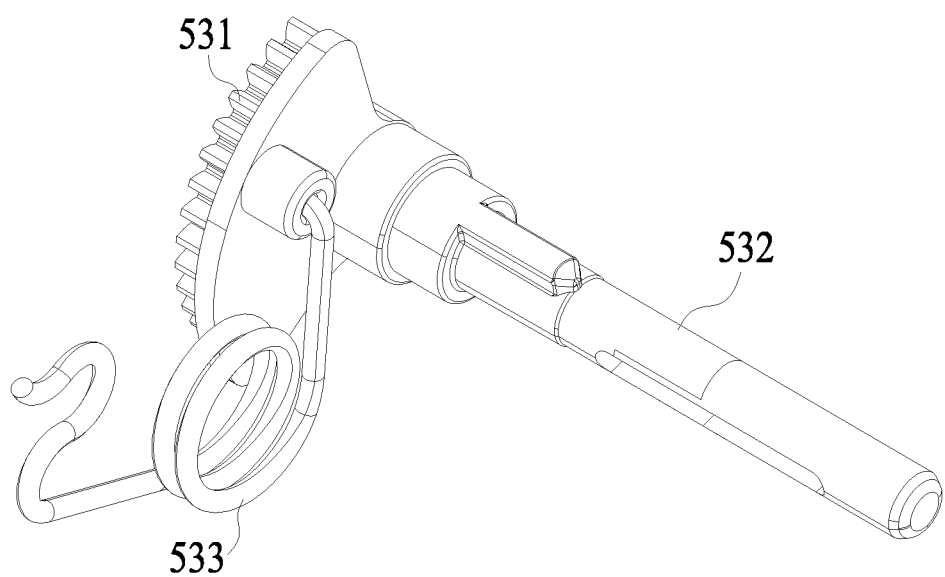
FIG. 5B is a schematic structural isometric view observed from the back of the rocker shown in FIGS. 1A-1C.

FIGS. 5A-5B are enlarged views of the rocker 130 shown in FIGS. 1A-1C and are used to show the specific structure of the rocker 130 more clearly. FIG. 5A is a schematic structural isometric view observed from the front of the rocker. FIG. 5B is a schematic structural isometric view of the rocker observed from the back.

As shown in FIGS. 5A-5B, the rocker 130 comprises a meshing portion 531. The meshing portion 531 is generally sector-shaped. Teeth are provided on the sector-shaped outer circumference and are configured to cooperate with the driving device 140, so that the rocker 130 can be driven by the driving device 140 to rotate.

The rocker 130 further comprises a rocker shaft 532. One end of the rocker shaft 532 is connected to the top of the sector shape of the meshing portion 531. The other end of the rocker shaft 532 may be inserted in the rocker mounting hole 217 on the mounting portion 220 of the base 101 and the mounting hole 175 in the hinging portion 173 of the hinge 170 accommodated in the mounting portion 220. The rocker shaft 532 is configured to be able to be fixedly connected to the hinge 170 after the rocker shaft 532 is inserted in the mounting hole 175 of the hinge 170, so that the rocker shaft 532 rotates to drive the flip cover 110 to open or close. The rocker shaft 532 and the hinge 170 may be fixedly connected in various manners, and are, for example, connected by a clamp pin, a buckle, or the like.

The rocker 130 further comprises a torsion spring 533. One end of the torsion spring 533 is fixed on a side, connected to the rocker shaft 532, of the meshing portion 531. The other end of the torsion spring 533 is configured to be fixed on the base 101. When the flip cover 110 is in the closed position, the torsion spring 533 provides a pre-tightening force, so that the flip cover 110 can be kept in the closed position and can be tightly attached to the top of the housing 210.

Figure 6:
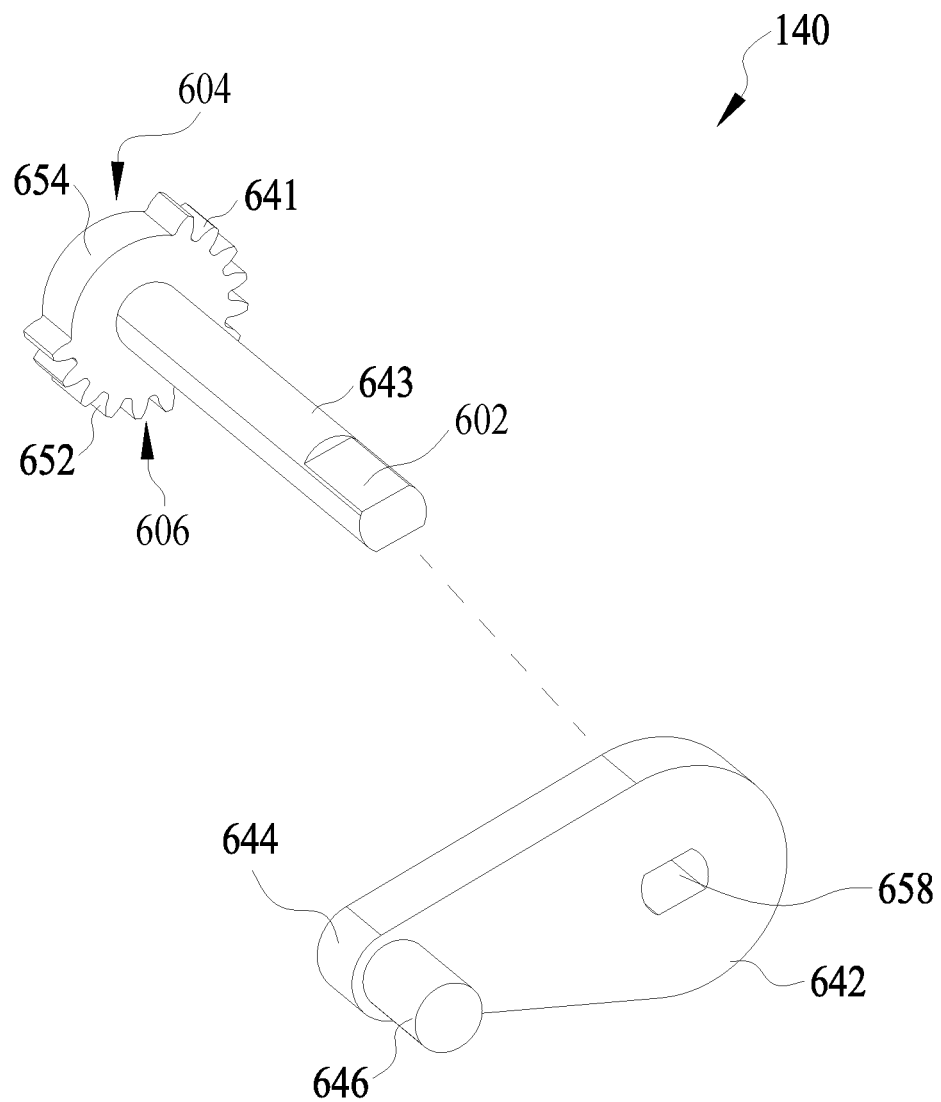
FIG. 6 is an enlarged view of a driving device shown in FIGS. 1A-1C.

FIG. 6 is an enlarged view of the driving device 140 shown in FIGS. 1A-1C and is used to show the specific structure of the components of the driving device 140 and the assembly relationship among the components more clearly. As shown in FIG. 6, the driving device 140 comprises a gear 641, an eccentric device 642, and a driving shaft 643. The gear 641 and the eccentric device 642 are disposed on the driving shaft 643 opposite each other and are rotatable as the driving shaft 643 rotates.

Specifically, the driving shaft 643 can pass through a driving opening 151 (shown in FIG. 1C) of the motor 150 and be connected to the motor 150, so that the driving shaft can be driven by the motor 150 to rotate. Two ends 602, 604 of the driving shaft 643 extend from two sides of the motor 150 and are respectively connected to the gear 641 and the eccentric device 642, so that the driving shaft can drive the gear 641 and the eccentric device 642 to rotate together. In the illustrated embodiments, one end 604 of the driving shaft 643 passes through the center of the gear 641 and is connected to the gear 641. A noncircular hole 658 is provided at the center of rotation of the eccentric device 642. The shape of the other end 602 of the driving shaft 643 is manufactured to be a noncircular shape corresponding to the noncircular hole (e.g., oblong, ovate, rectilinear, polygonal, etc.). The other end 602 of the driving shaft 643 is inserted in the noncircular hole 658 of the eccentric device 642, so that the eccentric device 642 can be prevented from rotating relative to the driving shaft 643. In this way, the driving shaft 643 can drive the gear 641 and the eccentric device 642 to rotate together. In some embodiments, the driving shaft 643 may be integrally formed with the gear 641 or the eccentric device 642.

A part of an outer circumference 606 of the gear 641 is provided with a toothed portion 652 to mesh with the meshing portion 531 of the rocker 130. The other part of the outer circumference 606 of the gear 641 is provided with a smooth portion 654 and does not mesh with the meshing portion 531 of the rocker 130.

The eccentric device 642 has a working portion 644. The working portion 644 is eccentrically disposed relative to the center of rotation of the eccentric device 642. A protrusion 646 is disposed on a side of the working portion 644. The protrusion 646 is disposed on a side, opposite the gear 641, of the eccentric device 642.

Figure 7:
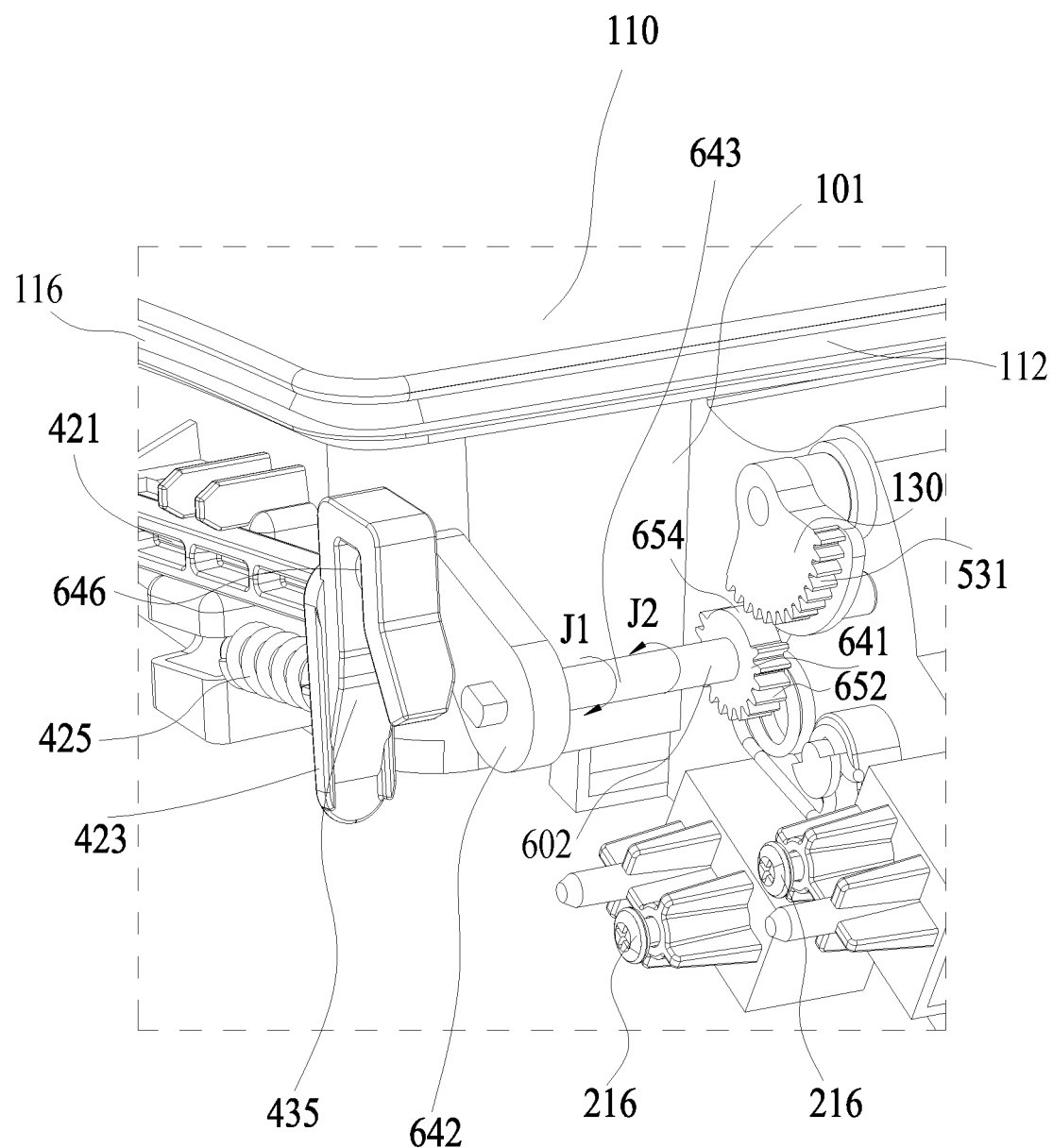
FIG. 7 is a partially enlarged view of the flip cover assembly in FIG. 1A.

FIG. 7 is a partially enlarged view of the flip cover assembly 100 in FIGS. 1A and 1s used to show the fitting relationship among the driving device 140 the rocker 130 and the locking device 120 more clearly. The view of the flip cover assembly 100 in FIG. 7 is obtained by rotating the flip cover assembly 100 in FIG. 1A clockwise by a particular angle, so that the right front portion (that is, the portion at the proximal end 112 and on the front side 116) of the flip cover assembly 100 is shown. Moreover, the motor 150 is omitted in FIG. 7 for the convenience of illustration of the driving shaft 643 of the driving device 140.

As shown in FIG. 7, an end 602, passing through the gear 641, of the driving shaft 643 of the driving device 140 is mounted in the driving device mounting hole 218 of the base 101. The gear 641 of the driving device 140 is located below the meshing portion 531 of the rocker 130. Although the motor 150 is not shown in FIG. 7, it may be known with reference to the contents shown in FIGS. 1A-1C that the position of the motor 150 on the driving shaft 643 is between the gear 641 and the eccentric device 642 of the driving device 140. The protrusion 646 of the eccentric device 642 may enter the receiving groove 435 of the eccentric device receiving portion 423 of the locking device 120.

The driving device 140 is configured to be rotatable when being driven by the motor 150, to enable the gear 641 and the eccentric device 642 to rotate as the driving device 140 rotates. During rotation, the gear 641 can mesh with the meshing portion 531 of the rocker 130 to drive the rocker 130 to rotate. As the eccentric device 642 rotates, the protrusion 646 of the eccentric device 642 may enter the receiving groove 435 of the eccentric device receiving portion 423 of the locking device 120 and can cooperate with the eccentric device receiving portion 423 of the locking device 120 to drive the locking device 120 to move. Moreover, the protrusion 646 of the eccentric device 642 may move out from the receiving groove 435 of the eccentric device receiving portion 423 of the locking device 120.

Specifically, as the gear 641 of the driving device 140 rotates, when the toothed portion 652 of the gear 641 rotates to the position where the toothed portion 652 of the gear 641 facing the meshing portion 531 of the rocker 130, the gear 541 meshes with the meshing portion 531 to drive the rocker 130 to rotate, thereby driving the flip cover 110 to open or close. When the smooth portion 654 of the gear 641 rotates to a position where the smooth portion 654 of the gear 641 facing the meshing portion 531 of the rocker 130, the gear 641 does not mesh with the meshing portion 531, so that the rocker 130 is kept still when the gear 541 rotates, and thereby the flip cover 110 is kept still as well.

When the eccentric device 642 of the driving device 140 rotates in the direction of an arrow J1, the protrusion 646 of the eccentric device 642 can enter the receiving groove 435 of the eccentric device receiving portion 423 of the locking rod 421 and reach the top of the receiving groove 435. Subsequently, as the eccentric device 642 further rotates in the direction of J1, the protrusion 646 can apply a pulling force towards the proximal end 102 of the base 101 to the locking rod 421 through the eccentric device receiving portion 423, to pull the locking rod 421 to move towards the proximal end 102 of the base 101, so that the locking rod 421 is moved from the released position to the locked position. When the eccentric device 642 of the driving device 140 rotates reversely in the direction of an arrow J2, the protrusion 646 of the eccentric device 642 can push the locking rod 421 to move towards the distal end 104 of the base 101 to enable the locking rod 421 to move from the locked position to the released position. As the locking rod 421 moves from the locked position to the released position, the smooth portion of the gear 641 faces the meshing portion 531 of the rocker 130, so that the rocker 130 is kept still, and thereby the flip cover 110 is kept still as well.

Because the meshing portion 531 of the rocker 130 meshes with the gear 641 to open and close the flip cover 110, an angle to which the flip cover 110 is opened is the same as an angle of rotation when the rocker 130 meshes with the gear 641. According to some embodiments, the central angle of the toothed portion 652 of the outer circumference of the gear 641 is greater than a maximal angle to which the flip cover can be opened.

The distance (or the arc length) that the smooth portion 654 of the gear 641 extends is related to the distance of travel by which the locking rod 421 moves from the locked position to the released position. The central angle of the smooth portion 654 of the outer circumference of the gear 641 needs to be set large enough to enable the eccentric device 642 to push the locking rod 421 from the locked position to the released position.

Figure 8A:
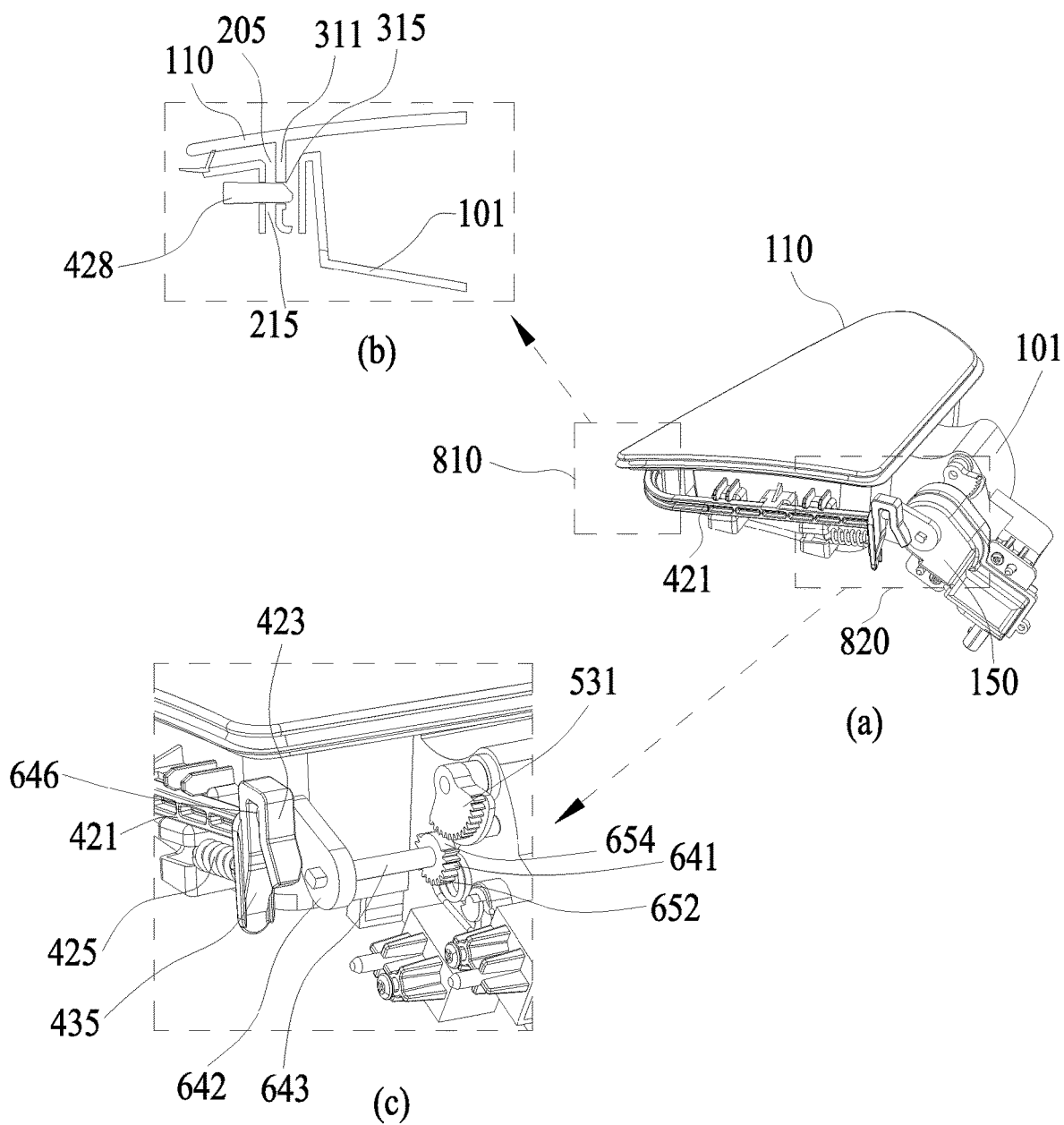
FIG. 8A is a view of a flip cover assembly when the flip cover is in a closed position and a locked state.
Figure 8B:
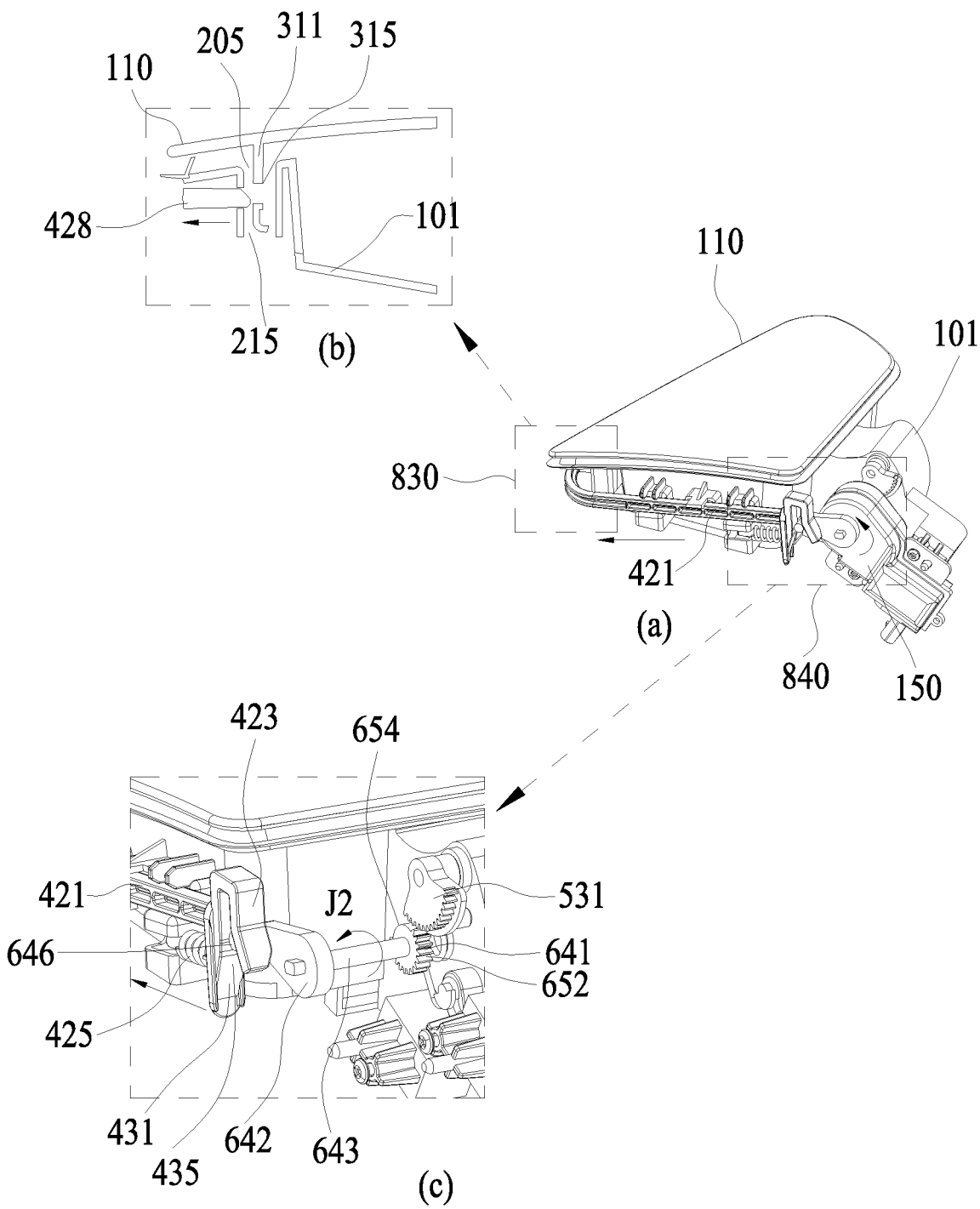
FIG. 8B is a view of the flip cover assembly when the flip cover is in a closed position and a released state.
Figure 8C:
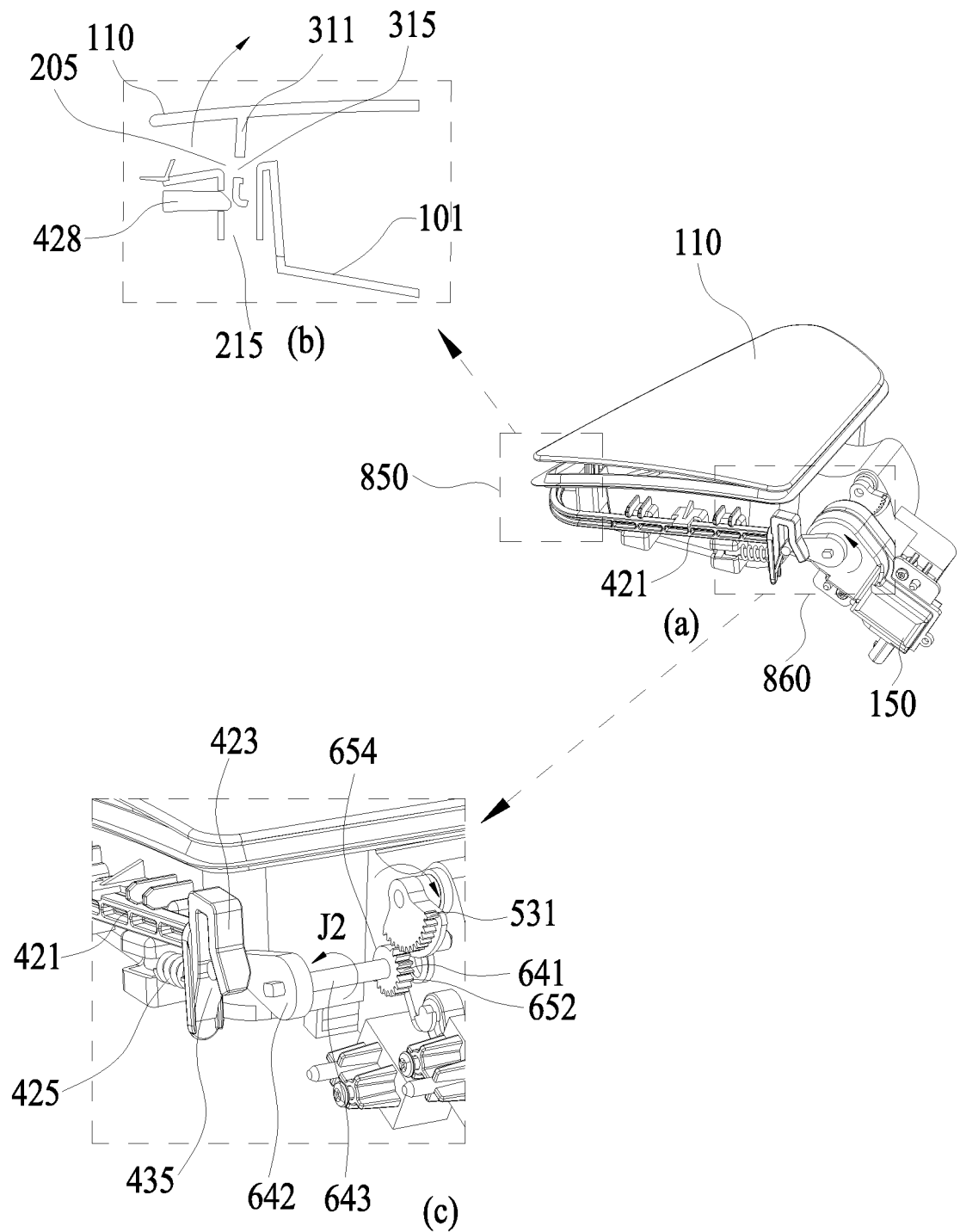
FIG. 8C is a view of the flip cover assembly when the flip cover is in a partially open position.
Figure 8D:
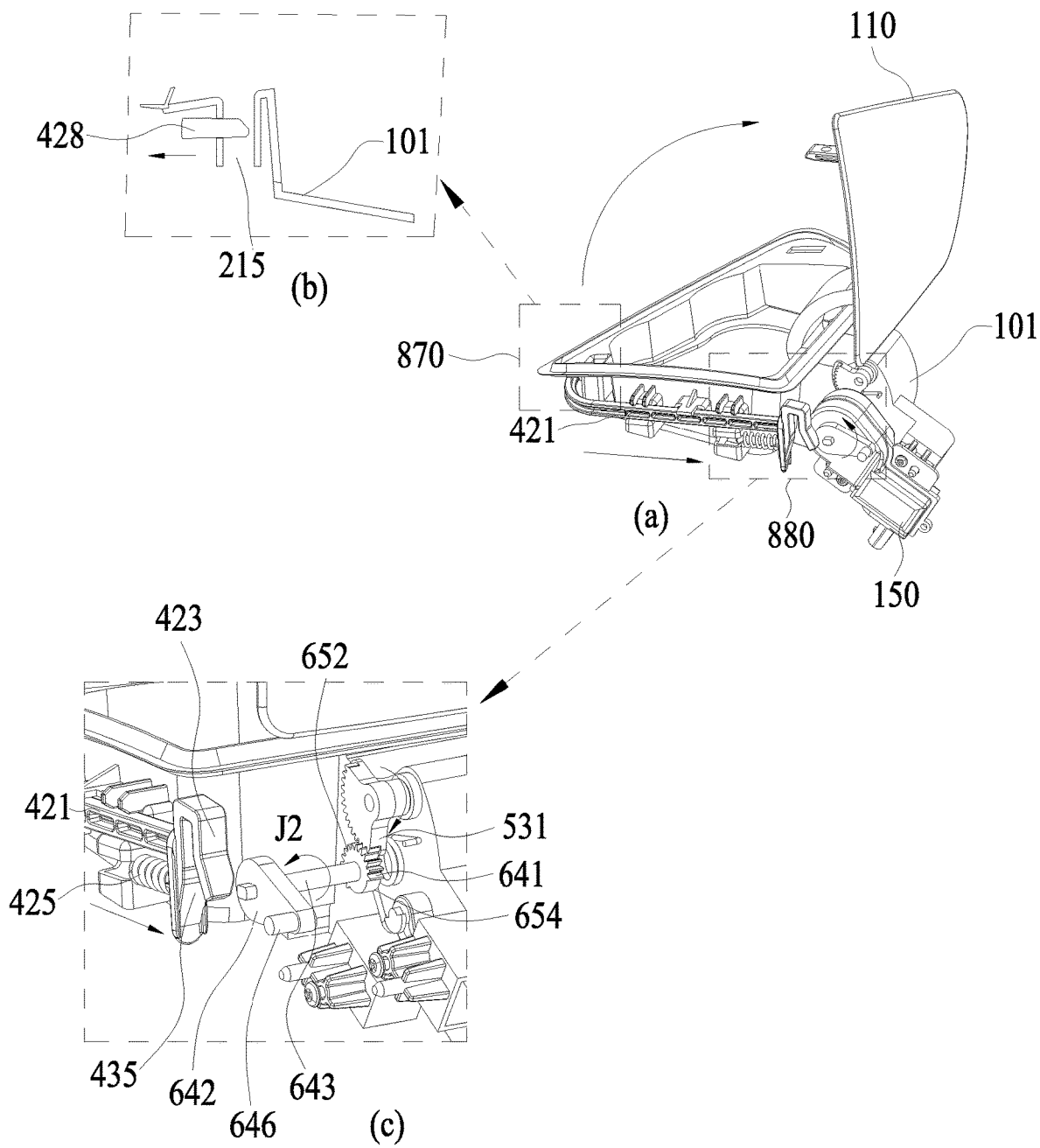
FIG. 8D is a view of the flip cover assembly when the flip cover is completely open.

FIGS. 8A-8D show a process of releasing and opening the flip cover 110. FIG. 8A is a view of the flip cover assembly 100 when the flip cover 110 is in the closed position and a locked state. FIG. 8B is a view of the flip cover assembly 100 when the flip cover 110 is in the closed position and a released state. FIG. 8C is a view of the flip cover assembly 100 when the flip cover 110 is in a partially open position. FIG. 8D is a view of the flip cover assembly 100 when the flip cover 110 is completely open.

In FIG. 8A, FIG. 8A-(a) is an isometric view of the flip cover assembly 100 when the flip cover 110 is in the closed position and the locked state. FIG. 8A-(b) is a partially enlarged sectional view of a part of the flip cover assembly 100 of FIG. 8A-(a) at a region 810 and is used to show that the locking pin 428 of the locking rod 421 locks the flip cover 110. FIG. 8A-(c) is a partially enlarged view of a part of the flip cover assembly 100 of FIG. 8A-(a) at a region 820 and is used to show the fitting relationship among the gear 641 and the eccentric device 642 of the driving device 140, the meshing portion 531 of the rocker 130 and the eccentric device receiving portion 423 of the locking device 120. For clarity of illustration, the motor 150 is omitted in FIG. 8A-(c), and the flip cover assembly 100 is further rotated clockwise by a particular angle.

As shown in FIG. 8A, the flip cover 110 is in the closed position, and the locking receiving portion 311 of the flip cover 110 is inserted in the locking opening 205 and the locking channel 215 of the base 101. The locking rod 421 of the locking device 120 is in the locked position, and the locking pin 428 of the locking device 120 is inserted in the locking hole 315 of the locking receiving portion 311 of the flip cover 110. In this case, the flip cover 110 is locked and thus cannot be opened.

When the locking rod 421 of the locking device 120 is in the locked position, the protrusion 646 on the eccentric device 642 of the driving device 140 is inserted in the receiving groove 435 of the eccentric device receiving portion 423 of the locking device 120, and the protrusion 646 is located at the top of the receiving groove 435. The smooth portion 654 of the gear 641 of the driving device 140 is facing the meshing portion 531 of the rocker 130.

In FIG. 8B, FIG. 8B-(a) is an isometric view of the flip cover assembly 100 when the flip cover 110 is in the closed position and the released state. FIG. 8B-(b) is a partially enlarged sectional view of a part of the flip cover assembly 100 in FIG. 8B-(a) at a region 830 and is used to show that the locking pin 428 of the locking rod 421 exits the locking hole 315 of the flip cover 110. FIG. 8B-(c) is a partially enlarged view of a part of the flip cover assembly 100 in FIG. 8B-(a) at a region 840 and is used to show the fitting relationship among the gear 641 and the eccentric device 642 of the driving device 140, the meshing portion 531 of the rocker 130 and the eccentric device receiving portion 423 of the locking device 120. For clarity of illustration, the motor 150 is omitted in FIG. 8B-(c), and the flip cover assembly 100 is further rotated clockwise by a particular angle.

A process from FIG. 8A to FIG. 8B is a process of releasing the flip cover. In this process, the motor 150 drives the driving shaft 643 of the driving device 140 to rotate forward in the direction of the arrow J2, thereby to drive the gear 641 and the eccentric device 642 to rotate forward in the direction of the arrow J2. The protrusion 646 of the eccentric device 642 moves downwards relative to the receiving groove 435 and applies a pushing force to the locking rod 421 through the side wall 431 of the receiving groove 435, thereby to push the locking rod 421 to move towards the distal end of the base 101. In this way, the locking pin 428 gradually exits the locking hole 315 of the flip cover 110 as the locking rod 421 moves, to release the flip cover 110. In this process, the smooth portion 654 of the gear 641 faces the meshing portion 531 of the rocker 130, and the rotation of the gear 641 does not drive the rotation of the rocker 130, and the rocker 130 is kept still.

In FIG. 8C, FIG. 8C-(a) is an isometric view of the flip cover assembly 100 when the flip cover 110 is in a partially open position. FIG. 8C-(b) is a partially enlarged sectional view of a part of the flip cover assembly 100 in FIG. 8C-(a) at a region 850 and is used to show that the locking receiving portion 311 of the flip cover 110 gradually exits the locking opening 205 of the base 101. FIG. 8C-(c) is a partially enlarged view of a part of the flip cover assembly 100 in FIG. 8C-(a) at a region 860 and is used to show the fitting relationship between the gear 641 and the eccentric device 642 of the driving device 140, the meshing portion 531 of the rocker 130 and the eccentric device receiving portion 423 of the locking device 120. For clarity of illustration, the motor 150 is omitted in FIG. 8C-(c), and the flip cover assembly 100 is further rotated clockwise by a particular angle.

As shown in FIG. 8C, after the locking pin 428 of the locking rod 421 has exited the locking hole 315 of the flip cover 110 to release the flip cover 110, the motor 150 continues to drive the driving shaft 643 of the driving device 140 to rotate forward in the direction of the arrow J2. The gear 641 continues to rotate therewith, and the toothed portion 652 of the gear 641 rotates to a position where the toothed portion 652 of the gear 641 is facing the meshing portion 531 of the rocker 130 so as to mesh with the meshing portion 531, so that the gear 641 drives the rocker 130 to rotate in an opposite direction and drives the flip cover 110 to rotate to open. The eccentric device 642 also continues to rotate therewith. During the rotation, the protrusion 646 of the eccentric device 642 continues to move downwards relative to the receiving groove 435 and gradually rotates out from the receiving groove 435.

In FIG. 8D, FIG. 8D-(a) is an isometric view of the flip cover assembly 100 when the flip cover 110 is in a completely open position. FIG. 8D-(b) is a partially enlarged sectional view of a part of the flip cover assembly 100 in FIG. 8D-(a) at a region 870 and is used to show that the locking pin 428 of the locking rod 421 is inserted in the locking channel 215 of the base 101. FIG. 8D-(c) is a partially enlarged view of a apart of the flip cover assembly 100 in FIG. 8D-(a) at a region 880 and is used to show the fitting relationship among the gear 641 and the eccentric device 642 of the driving device 140, the meshing portion 531 of the rocker 130 and the eccentric device receiving portion 423 of the locking device 120. For clarity of illustration, the motor 150 is omitted in FIG. 8D-(c), and the flip cover assembly 100 is further rotated clockwise by a particular angle.

As shown in FIG. 8D, compared with that shown in FIG. 8C, the motor 150 continues to drive the driving shaft 643 of the driving device 140 to rotate forward in the direction of the arrow J2. The gear 641 remains mesh with the meshing portion 531 of the rocker 130 and continues to rotate until the flip cover 110 is completely open. The eccentric device 642 rotates therewith, and after rotating to an angle, the protrusion 646 of the eccentric device 642 rotates out from the receiving groove 435 to disengage from the locking rod 421, so that the spring 425 pushes the locking rod 421 to move towards the proximal end 102 of the base 101 to return to the locked position of the locking rod 421, to enable the locking pin 428 of the locking rod 421 to enter the locking channel 215 of the base 101. In this case, although the locking rod 421 of the locking device 120 is in the locked state, because the flip cover 110 is not closed, the locking device 120 cannot lock the flip cover 110.

Figure 9A:
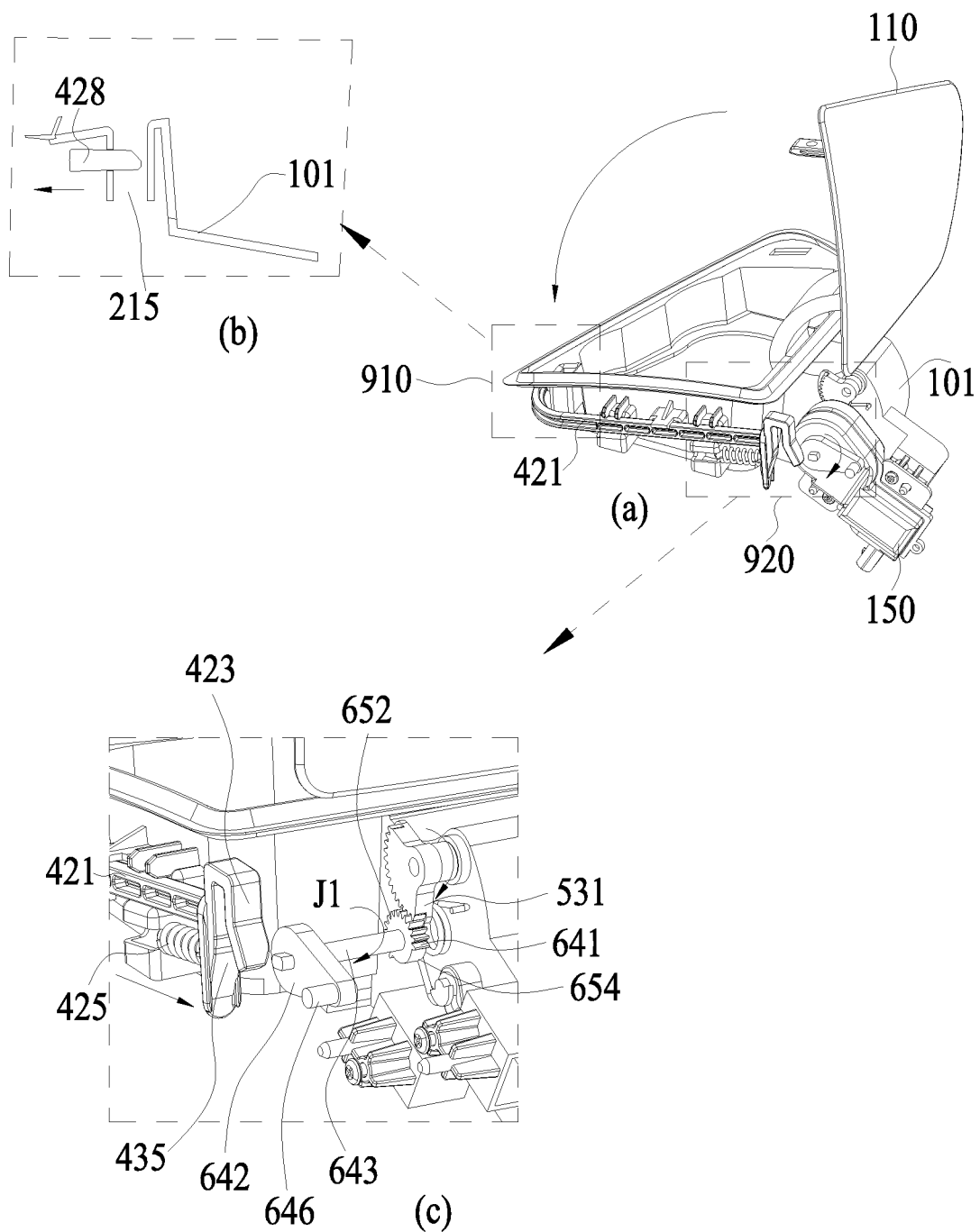
FIG. 9A is a view of the flip cover assembly when the flip cover is in a completely open position.
Figure 9B:
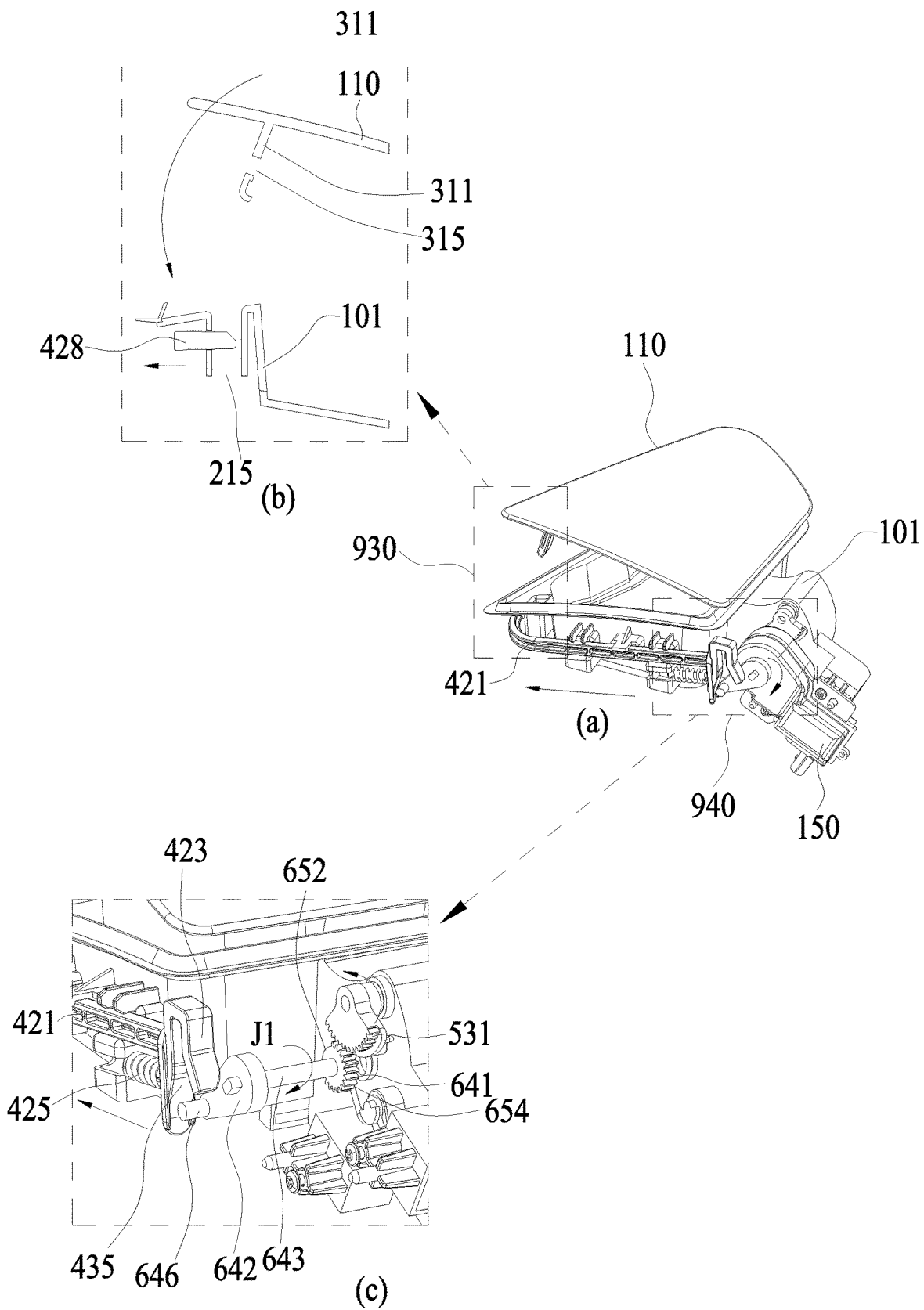
FIG. 9B is a view of the flip cover assembly when the flip cover is in a process of being closed.
Figure 9C:
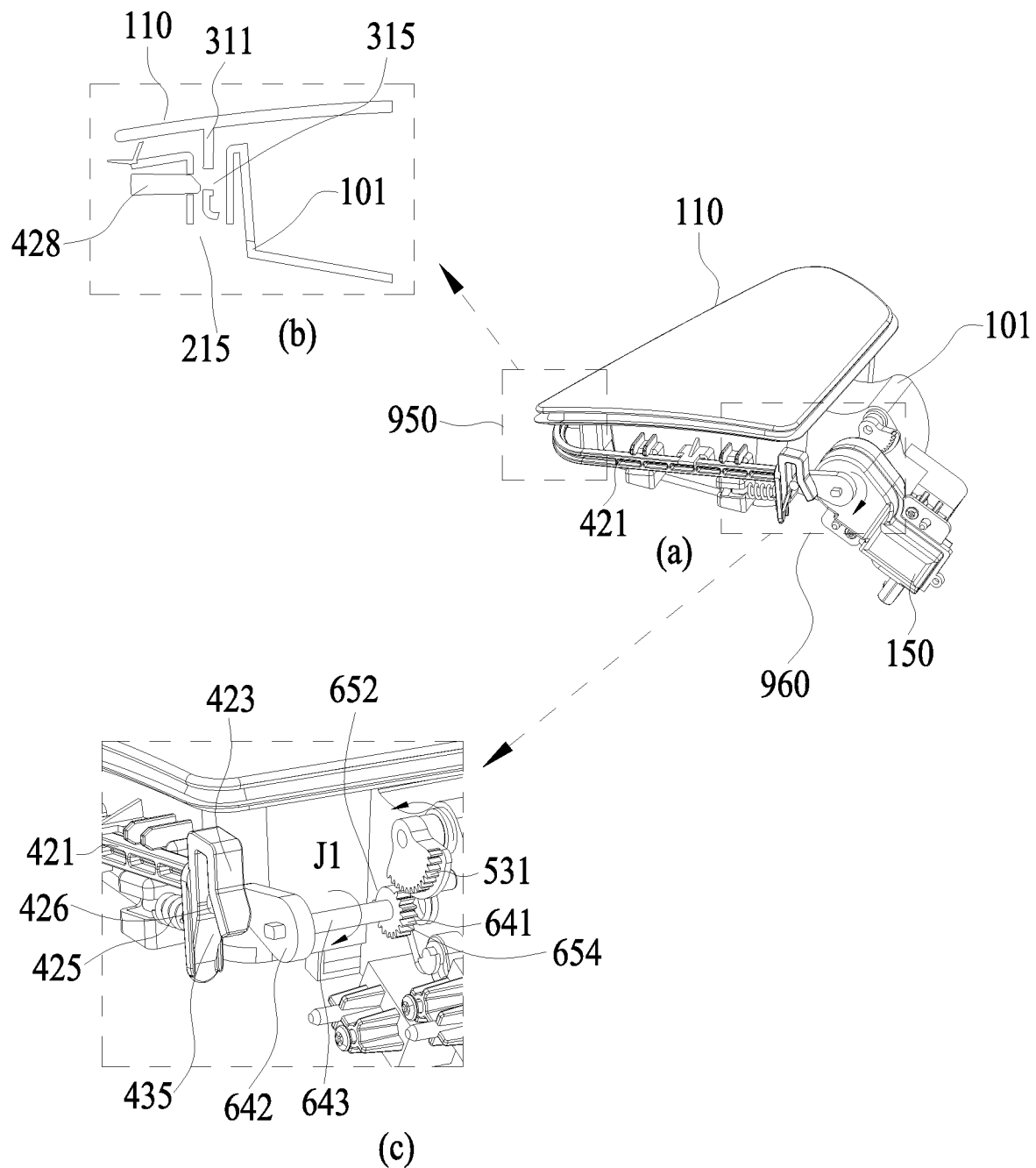
FIG. 9C is a view of the flip cover assembly when the flip cover is completely closed but is not locked yet.
Figure 9D:
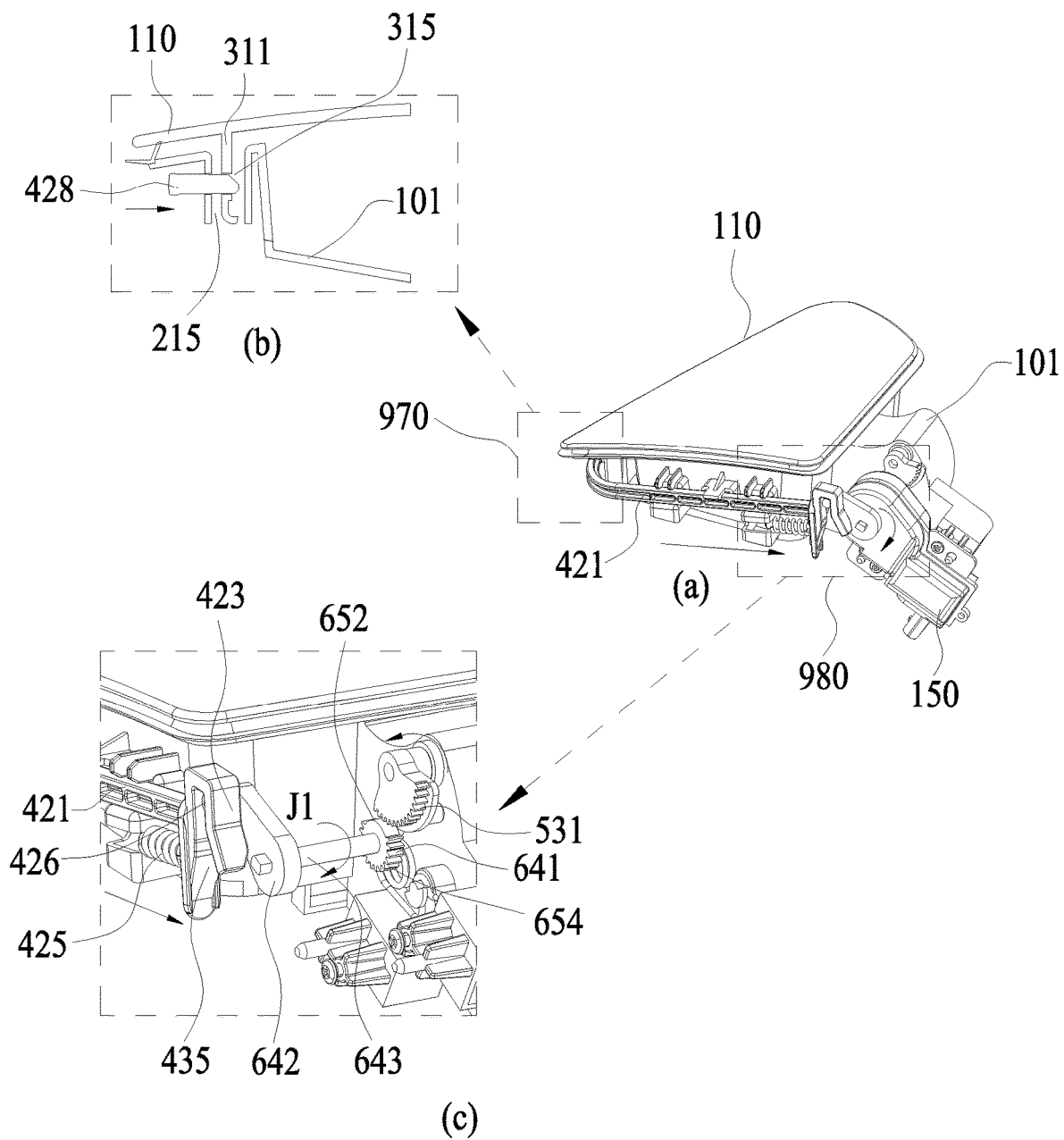
FIG. 9D is a view of the flip cover assembly when the flip cover is closed and locked.

FIGS. 9A-9D show a process of closing and locking the flip cover 110. FIG. 9A is a view of the flip cover assembly 100 when the flip cover 110 is in a completely open position. FIG. 9B is a view of the flip cover assembly 100 when the flip cover 110 is in the process of being closed. FIG. 9C is a view of the flip cover assembly 100 when the flip cover 110 is completely closed but is not locked yet. FIG. 9D is a view of the flip cover assembly 100 when the flip cover 110 is closed and locked.

FIG. 9A corresponds to FIG. 8D and details are not repeated herein. In the state in which the flip cover 110 is in a completely open position shown in FIG. 9A, if the flip cover 110 needs to be closed, the motor 150 needs to drive the driving shaft 643 of the driving device 140 to rotate reversely in the direction of the arrow J1.

In FIG. 9B, FIG. 9B-(a) is an isometric view of the flip cover assembly 100 when the flip cover 110 is being closed; FIG. 9B-(b) is a partially enlarged sectional view of a part of the flip cover assembly 100 in FIG. 9B-(a) at a region 930 and is used to show that the locking pin 428 of the locking rod 421 is inserted in the through hole 207 of the base 101 but the locking pin 428 is not inserted in the locking hole 315 of the flip cover 110 yet; FIG. 9B-(c) is a partially enlarged view of a part of the flip cover assembly 100 in FIG. 9B-(a) at a region 940 and is used to show the fitting relationship among the gear 641 and the eccentric device 642 of the driving device 140, the meshing portion 531 of the rocker 130 and the eccentric device receiving portion 423 of the locking device 120. For clarity of illustration, the motor 150 is omitted in FIG. 9B-(c), and the flip cover assembly 100 is further rotated clockwise by a particular angle.

As shown in FIG. 9B, compared with that shown in FIG. 9A, the motor 150 drives the driving shaft 643 of the driving device 140 to rotate reversely in the direction of the arrow J1. The eccentric device 642 rotates therewith. Because the locking rod 421 is located at its locked position at this time, after the eccentric device 642 rotates to an angle, the protrusion 646 of the eccentric device 642 can enter the receiving groove 435 of the eccentric device receiving portion 423, thereby to enable the eccentric device 642 to continue to rotate to push the locking rod 421 towards the distal end of the base 101 to move to its released position. The locking rod 421 moves from its locked position to its released position, so that the locking pin 428 of the locking rod 421 can gradually exit outwards the locking channel 215 of the base 101, thereby to enable the locking receiving portion 311 of the flip cover 110 to be inserted in the locking channel 215 of the base 101. In this process, the gear 641 meshes with the meshing portion 531 of the rocker 130, to drive the flip cover 110 to rotate from the completely open position to the closed position.

In FIG. 9C, FIG. 9C-(a) is an isometric view of the flip cover assembly 100 when the flip cover 110 is completely closed but is not locked yet. FIG. 9C-(b) is a partially enlarged sectional view of a part of the flip cover assembly 100 in FIG. 9C-(a) at a region 950 and is used to show that the locking receiving portion 311 of the flip cover 110 is inserted in the locking channel 215 of the base 101 but the locking pin 428 of the locking device 120 is not inserted in the locking hole 315 in the locking receiving portion 311 of the flip cover 110 yet; FIG. 9C-(c) is a partially enlarged view of a part of the flip cover assembly 100 in FIG. 9C-(a) at a region 960 and is used to show the fitting relationship among the gear 641 and the eccentric device 642 of the driving device 140, the meshing portion 531 of the rocker 130 and the eccentric device receiving portion 423 of the locking device 120. For clarity of illustration, the motor 150 is omitted in FIG. 9B-(c), and the flip cover assembly 100 is further rotated clockwise by a particular angle.

As shown in FIG. 9C, when the flip cover 110 is completely closed but is not locked yet, the eccentric device 642 keeps the locking rod 421 at its released position by the eccentric device receiving portion 423, so that the locking pin 428 of the locking device 120 is not inserted in the locking hole 315 in the locking receiving portion 311 of the flip cover 110 yet. In this case, although the locking receiving portion 311 of the flip cover 110 is inserted in the locking channel 215 of the base 101, the flip cover 110 is not locked yet.

FIG. 9D corresponds to FIG. 8A, details of the views in FIG. 9D are not repeated herein. A process from FIG. 9C to FIG. 9D is a process of locking the flip cover 110. In this process, the motor 150 continues to drive the driving shaft 643 of the driving device 140 to rotate reversely in the direction of the arrow J1. The eccentric device 642 continues to rotate therewith. As the eccentric device 642 rotates, the protrusion 646 of the eccentric device 642 pulls the locking rod 421 to move from the released position to the locked position, so that the locking pin 428 is inserted in the locking hole 315 of the locking receiving portion 311 of the flip cover 110, thereby to lock the flip cover 110. In the process of locking the flip cover 110, the smooth portion 654 of the gear 641 is facing the meshing portion 531 of the rocker 130, the rotation of the gear 641 does not drive the rotation of the rocker 130, and the rocker 130 is kept still.

In an existing flip cover assembly, the following two manners are usually used to open or close and lock or unlock a flip cover. In one manner, the flip cover is manually opened or closed and is automatically locked or released. For example, when the flip cover is in the closed position, a driving motor is first controlled to drive a locking device to release the flip cover, and the flip cover is then manually pressed. A push-push mechanism and a spring are combined to eject the flip cover. To close the flip cover, the flip cover is first manually closed to the closed position, and the driving motor is then controlled to drive the locking device to lock the flip cover. Such operation needs to be manually performed from outside the body of a vehicle, but the flip cover cannot be opened or closed under the control from inside the body of the vehicle. In another manner, the flip cover is automatically opened, closed and locked, which is driven respectively by independent driving devices. Such an operation requires two driving devices and control interfaces thereof, a relatively large assembly space is required, and both mounting and controlling are relatively complex.

In the flip cover assembly 100 and the flip cover actuation structure of the same provided in the present disclosure, the flip cover 110 can be automatically opened, closed, locked and unlocked by using one power source (motor) 150, no additional manual operation is required, and no operation from outside the body of a vehicle is required. Therefore, the flip cover assembly 100 and the flip cover actuation structure of the same provided in the present disclosure require a relatively small assembly space and have relatively simple control logic. The opening, closing, and locking which may be required to cooperate with each other can be controlled by using one control port, so that the assembly and operations are more convenient, and the operation stability is greatly improved.

This description uses examples to disclose the present disclosure, in which one or more examples are illustrated in the drawings. Each example is provided to explain the present disclosure but is not intended to limit the present disclosure. In fact, it would have been obvious to those skilled in the art that various modifications and variations can be made to the present disclosure without departing from the scope or spirit of the present disclosure. For example, the illustrated or described features as part of one embodiment can be used with another embodiment to provide a further embodiment. Thus, it is intended that the present disclosure cover the modifications and variations made within the scope of the appended claims and their equivalents.

The invention claimed is:

1. A flip cover actuation structure to actuate a flip cover, the flip cover actuation structure comprising:
    a locking device to lock and release the flip cover;
    a rocker to drive the flip cover to open and close; and
    a driving device comprising a gear, a driving shaft, and an eccentric device, a portion of the driving device being configured to rotate the gear and the eccentric device,
    wherein the gear drives the rocker, and the eccentric device drives the locking device, and
    wherein the driving shaft contacts the gear and the eccentric device.

2. The flip cover actuation structure according to claim 1, wherein
    the gear and the eccentric device are disposed on the driving shaft opposite one another and rotate with the driving shaft.

3. The flip cover actuation structure according to claim 2, wherein:
    a first portion of an outer circumference of the gear meshes with the rocker, and
    a second portion of the outer circumference releases the gear from the rocker.

4. The flip cover actuation structure according to claim 3, wherein the gear is configured to rotate independently from the rocker when the eccentric device drives the locking device to release the flip cover.

5. The flip cover actuation structure according to claim 3, wherein:
    the first portion is a toothed portion, and
    the second portion is a smooth portion, such that the toothed portion meshes with the rocker, and the smooth portion does not mesh with the rocker.

6. The flip cover actuation structure according to claim 5, wherein the toothed portion has a central angle greater than a maximal angle to which the flip cover can be opened.

7. The flip cover actuation structure according to claim 1, wherein:
    the locking device comprises a locking rod, a distal end of the locking rod being provided with a locking portion to lock the flip cover, and
    the eccentric device has a working portion configured to push the locking rod from a locked position to a released position and pull the locking rod from the released position to the locked position when the working portion contacts with the locking device.

8. The flip cover actuation structure according to claim 7, wherein the flip cover is provided with a locking receiving portion to receive the locking portion.

9. The flip cover actuation structure according to claim 7, wherein:
    a proximal end of the locking rod is provided with an eccentric device receiving portion,
    the eccentric device receiving portion comprises a receiving groove,
    the working portion of the eccentric device is provided with a protrusion, and
    when the eccentric device rotates, the protrusion enters the receiving groove and disengages from the receiving groove.

10. The flip cover actuation structure according to claim 7, wherein the locking device further comprises an elastic device to apply a biasing force to the locking rod to move the locking rod from the released position to the locked position.

11. The flip cover actuation structure according to claim 1, wherein the rocker comprises a sector-shaped meshing portion having teeth to mesh with the gear.

12. The flip cover actuation structure according to claim 11, wherein the rocker further comprises a rocker shaft disposed at a top of the sector-shaped meshing portion, the rocker shaft being connected to the flip cover so that as the rocker shaft rotates, the flip cover opens or closes.

13. The flip cover actuation structure according to claim 1, wherein the portion of the driving device includes a power source configured to rotate the gear, the driving shaft, and the eccentric device.

14. A flip cover assembly for a refueling port or charging port, the flip cover assembly comprising:
   a flip cover;
   a base; and
   a flip cover actuation structure comprising:
      a locking device to lock and release the flip cover, the locking device including a locking rod;
      a rocker to drive the flip cover to open and to drive the flip cover to close;
      a driving device comprising a gear, an eccentric device, a power source, and a portion of the driving device that connects the gear to the eccentric drive and is configured to rotate the gear and the eccentric device when powered by the power source,
      wherein the gear drives the rocker, and the eccentric device drives the locking device,
      wherein a portion of the driving device is mounted to the base,
      wherein the flip cover rotates with respect to the base when the flip cover is driven to open and when the flip cover is driven to close, the flip cover including a locking receiving portion that defines a locking hole, and
      wherein when the locking rod is inserted into the locking hole, the flip cover is locked closed.

15. The flip cover assembly according to claim 14, wherein:
   the portion of the driving device mounted to the base is mounted at a first proximal end of the base,
   the locking rod is mounted on an outer side of a front side wall of the base and extends from a second proximal end to a first distal end,
   the first distal end of the locking rod is provided with a locking portion to lock the flip cover,
   a third proximal end of the flip cover is rotatably mounted at the first proximal end of the base, and
   a second distal end of the flip cover is provided with the locking hole configured to receive the locking portion of the locking rod.

16. The flip cover assembly according to claim 14, wherein the portion of the driving device that connects the gear to the eccentric drive includes a driving shaft with an end that that passes through a center of the gear,
   wherein the rocker is biased by a spring, and
   wherein when the driving shaft rotates when powered by the power source, the gear and the eccentric drive both rotate.

17. The flip cover assembly according to claim 14, wherein the locking device has a first end and a second end, and includes an elastic device, an eccentric device receiving portion, a locking portion, a sleeve rod, and a locking pin,
   wherein the sleeve rod is configured to support the elastic device,
   wherein the sleeve rod, the elastic device, and the eccentric receiving portion are adjacent to the first end,
   wherein the locking portion and the locking pin are adjacent to the second end, and
   wherein the eccentric receiving portion is configured to retain a portion of the eccentric device.

18. The flip cover assembly according to claim 14, wherein the locking device includes an elastic device and an eccentric device receiving portion; and
   the eccentric device includes a protrusion,
   wherein the protrusion is received in the eccentric device receiving portion when the flip cover is locked by the locking device, and the protrusion is not received in the eccentric device receiving portion when the flip cover is released by the locking device.

19. The flip cover assembly according to claim 14, wherein the base includes a groove,
   the rocker is connected to the flip cover,
   the flip cover rotates with respect to the base around a hinge, and
   a portion of the locking device is received in the groove such that the locking device can move along the groove when the flip cover is driven to open and when the flip cover is driven to close.

* * * * *